United States Patent
Gaist

(10) Patent No.: US 9,940,181 B2
(45) Date of Patent: Apr. 10, 2018

(54) SYSTEM AND METHOD FOR REACTING TO SYSTEM CALLS MADE TO A KERNAL OF THE SYSTEM

(75) Inventor: Nir Gaist, Rishon Letzion (IL)

(73) Assignee: NYOTRON INFORMATION SECURITY LTD., Tel Aviv (*) Notice: Subject to any disclaimer, the term of this patent is extended or adjusted under 35 U.S.C. 154(b) by 817 days.

(21) Appl. No.: 12/983,897

(22) Filed: Jan. 4, 2011

(65) Prior Publication Data

US 2011/0167434 A1 Jul. 7, 2011

Related U.S. Application Data

(63) Continuation-in-part of application No. 12/502,668, filed on Jul. 14, 2009, now abandoned.

(60) Provisional application No. 61/080,290, filed on Jul. 14, 2008.

(51) Int. Cl.
*G06F 9/54* (2006.01)

(52) U.S. Cl.
CPC ........ *G06F 9/545* (2013.01); *G06F 2209/542* (2013.01)

(58) Field of Classification Search
None
See application file for complete search history.

(56) References Cited

U.S. PATENT DOCUMENTS

| | | | |
|---|---|---|---|
| 6,480,962 B1 | 11/2002 | Touboul | |
| 6,779,181 B1 | 8/2004 | Yu et al. | |
| 7,870,387 B1 | 1/2011 | Bhargava et al. | |
| 8,272,048 B2 | 9/2012 | Cooper et al. | |
| 2005/0257243 A1* | 11/2005 | Baker | 726/1 |
| 2008/0320595 A1 | 12/2008 | van der Made | |
| 2009/0158385 A1* | 6/2009 | Kim et al. | 726/1 |
| 2009/0199296 A1* | 8/2009 | Xie et al. | 726/23 |

* cited by examiner

*Primary Examiner* — Nadia Khoshnoodi
(74) *Attorney, Agent, or Firm* — Reches Patents

(57) ABSTRACT

A method for reacting to system calls made to a kernel of a computerized system, the method includes controlling an execution of at least one system call by the kernel in response to a result of a comparison between information of system calls mane to a kernal and between data structure elements (DEs) of a non-executable control data structure that includes fields that correspond to the system call type fields, to the system call initiator fields and to the system call request fields of the segments of the first control data structure. The method also includes (A) Receiving a first control data structure. The first control data includes multiple segments. Each segment includes a system call type field, at least one system call initiator field and at least one system call request field. And (B) Converting the first control data structure into the non-executable control data structure.

33 Claims, 15 Drawing Sheets

SYSTEM AND METHOD FOR REACTING TO SYSTEM CALLS MADE TO A KERNAL OF THE SYSTEM

RELATED APPLICATIONS

This application is a continuation in part of U.S. patent application Ser. No. 12/502,668 filing date Jul. 14, 2009 which in turn claims priority from U.S. provisional Patent Application Ser. No. 61/080,290 filing date Jul. 14, 2008, both of which are incorporated herein by its entirety.

BACKGROUND OF THE INVENTION

System calls are used by user mode applications to request the execution of various operations from entities operating in the kernel. Systems call can be roughly grouped into five major categories:
i. Process Control (e.g. load, execute, create process, terminate process, get/set process attributes, wait for time, wait event, allocate, free memory, etc.);
ii. File management (e.g. create file, delete file, open, close, read, write, reposition, get/set file attributes);
iii. Device Management (e.g. request device, release device, read, write, reposition, get/set device attributes, logically attach or detach devices);
iv. Information Maintenance (e.g. get/set time or date, get/set system data, get/set process, file, or device attributes); and
v. Communication. (e.g. create, delete communication connection, send, receive messages, transfer status information, attach or detach remote devices)

SUMMARY OF THE INVENTION

According to an embodiment of the invention a method for reacting to system calls made to a kernel of a computerized system is provided. The method may include receiving a first control data structure that may include multiple segments; wherein each segment may include a system call type field, at least one system call initiator field and at least one system call request field; converting the first control data structure into a non-executable control data structure that may include multiple data-structure elements (DEs), wherein the DEs comprise DE fields that correspond to the system call type fields, to the system call initiator fields and to the system call request fields of the segments of the first control data structure; monitoring system calls made to the kernel by a comparing information of system calls made to the kernel to DE-fields of the non-executable control data structure; and controlling an execution of at least one system call by the kernel in response to a result of the comparing. The data structure control data structure can be non-executable in the sense that is differs from an executable file that causes a computer to perform indicated tasks according to encoded instructions.

The controlling may be preceded by retrieving a content of at least one field of the non-executable control data structure that may be selected in response to the result of the comparison, wherein the controlling may include controlling the execution in response to the content of the at least one field.

The first control data structure may include interrelations information indicative of interrelations between segments of at least one group of segments, wherein the converting may include inserting into DEs of the non-executable control data structure pointers to other DEs selected in response to the interrelations information.

The method may include modifying, in response to the result of the comparing and in response to the interrelation information, the availability for selection of at least one DE; wherein the monitoring may include selecting, in response to the result of the comparing, a DE that may be made available for selection only after its availability for selection was modified in response to the interrelation information.

The order of segments in the first control data structure determines a selection order of DEs in the non-executable control data structure during the monitoring.

The controlling may include selectively enabling, in response to the result of the comparing, a fulfillment by a hardware device of an operation that may be requested in the system call.

The controlling may include preventing a security threat to the computerized system by selectively preventing, in response to the result of the comparing, a fulfillment by a hardware device of an operation that may be requested in the system call.

The converting may be followed by storing the non-executable control data structure in a kernel memory of the kernel of the computerized entity, wherein the comparing may include comparing the information of system calls made to the kernel to the DE-fields of the non-executable control data structure that may be stored in the kernel memory.

The converting and monitoring are carried out by a dedicated driver operating in kernel mode of a computerized system.

The rules data may be user comprehendible user data, which may be comprehendible to people.

The non-executable control data structure may include a dynamic variable, wherein a value of the dynamic variable may be known only after an initiation of the monitoring.

The value of the dynamic variable may be responsive to an outcome of a comparison of information of a system call made to the kernel to a DE-field of the non-executable control data structure.

According to an embodiment of the invention a computer implementing a kernel is provided. The computer may include a processor that may be configured to run processes in kernel mode and to run other processes not in kernel mode, wherein the processor may be configured to execute, when in the kernel mode, the following processes: receiving a first control data structure that comprises multiple segments; wherein each segment comprises a system call type field, at least one system call initiator field and at least one system call request field; converting the first control data structure into a non-executable control data structure that comprises multiple data-structure elements (DEs), wherein the DEs comprise DE fields that correspond to the system call type fields, to the system call initiator fields and to the system call request fields of the segments of the first control data structure; monitoring system calls made to the kernel by a comparing information of system calls made to the kernel to DE-fields of the non-executable control data structure; and controlling an execution of at least one system call by the kernel in response to a result of the comparing.

The processor may be further configured to retrieve, before the controlling of the execution, a content of at least one field of the non-executable control data structure that may be selected in response to the result of the comparison, wherein the controlling comprises controlling the execution in response to the content of the at least one field.

The first control data structure comprise interrelations—information indicative of interrelations between segments of at least one group of segments, wherein the processor may be further configured to insert into DEs of the non-executable control data structure pointers to other DEs selected in response to the interrelations information.

The processor may be further configured to modify, in response to the result of the comparing and in response to the interrelation information, the availability for selection of at least one DE; wherein the monitoring comprises selecting, in response to the result of the comparing, a DE that may be made available for selection only after its availability for selection was modified in response to the interrelation information.

The order of segments in the first control data structure determines a selection order of DEs in the non-executable control data structure during the monitoring.

The processor may be further configured to selectively enable, in response to the result of the comparing, a fulfillment by a hardware device of an operation that may be requested in the system call.

The processor may be further configured to prevent a security threat to the computerized system by selectively preventing, in response to the result of the comparing, a fulfillment by a hardware device of an operation that may be requested in the system call.

The converting may be followed by storing the non-executable control data structure in a kernel memory of the kernel of the computerized entity, wherein the comparing comprises comparing the information of system calls made to the kernel to the DE-fields of the non-executable control data structure that may be stored in the kernel memory.

The processor hosts a dedicated driver operating in kernel mode of a computerized system that may be configured to execute the converting and the monitoring.

The rules data may be user comprehendible user data, which may be comprehendible to people.

The non-executable control data structure may include a dynamic variable, wherein a value of the dynamic variable may be known only after an initiation of the monitoring.

The value of the dynamic variable may be responsive to an outcome of a comparison of information of a system call made to the kernel to a DE-field of the non-executable control data structure.

A computer readable medium may be provided that may be tangibly embodied in a non-transitory storage media, with instruction which, when executed, cause a processor of a computer that implements a kernel, to: receive a first control data structure that comprises multiple segments; wherein each segment comprises a system call type field, at least one system call initiator field and at least one system call request field; convert the first control data structure into a non-executable control data structure that comprises multiple data-structure elements (DEs), wherein the DEs comprise DE fields that correspond to the system call type fields, to the system call initiator fields and to the system call request fields of the segments of the first control data structure; monitor system calls made to the kernel by a comparing information of system calls made to the kernel to DE-fields of the non-executable control data structure; and control an execution of at least one system call by the kernel in response to a result of the comparing.

The computer readable medium may further store instructions for retrieving a content of at least one field of the non-executable control data structure that is selected in response to the result of the comparison, wherein the controlling comprises controlling the execution in response to the content of the at least one field.

The first control data structure comprise interrelations information indicative of interrelations between segments of at least one group of segments, wherein the computer readable medium further stores instructions for inserting into DEs of the non-executable control data structure pointers to other DEs selected in response to the interrelations information.

The computer readable medium may further store instructions for modifying, in response to the result of the comparing and in response to the interrelation information, the availability for selection of at least one DE; wherein the monitoring comprises selecting, in response to the result of the comparing, a DE that is made available for selection only after its availability for selection was modified in response to the interrelation information.

The order of segments in the first control data structure determines a selection order of DEs in the non-executable control data structure during the monitoring.

The computer readable medium may further store instructions for selectively enabling, in response to the result of the comparing, a fulfillment by a hardware device of an operation that is requested in the system call.

The computer readable medium may further store instructions for preventing a security threat to the computerized system by selectively preventing, in response to the result of the comparing, a fulfillment by a hardware device of an operation that is requested in the system call.

The computer readable medium may further store instructions for storing the non-executable control data structure in a kernel memory of the kernel of the computerized entity, wherein the comparing comprises comparing the information of system calls made to the kernel to the DE-fields of the non-executable control data structure that is stored in the kernel memory.

The rules data is user comprehendible user data, which is comprehendible to people.

The instructions may be executed by a dedicated driver operating in kernel mode that is run by the processor.

The non-executable control data structure may include a dynamic variable, wherein a value of the dynamic variable may be known only after an initiation of the monitoring.

The value of the dynamic variable may be responsive to an outcome of a comparison of information of a system call made to the kernel to a DE-field of the non-executable control data structure.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
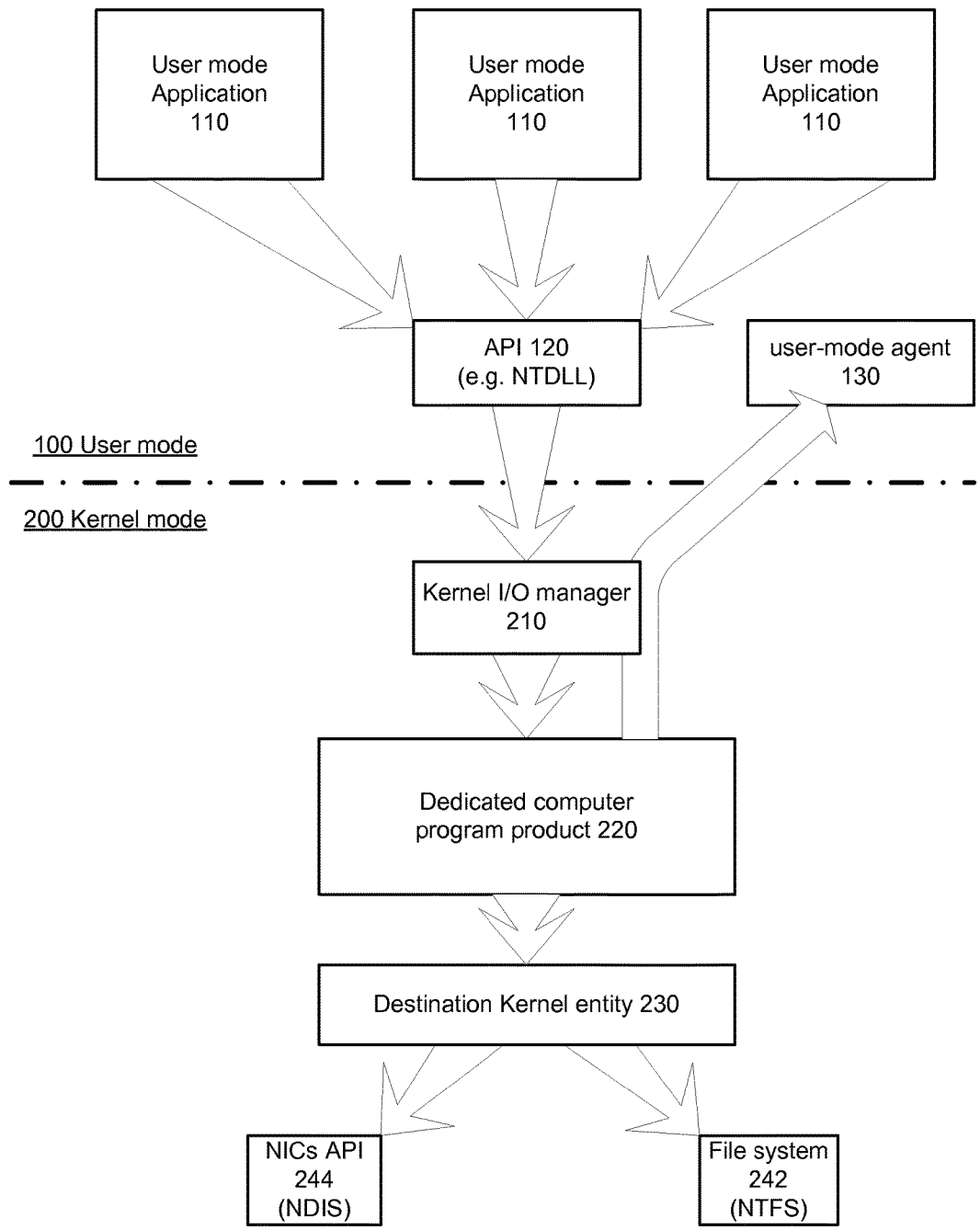
FIGS. 1A and 1B illustrate a system operable for processing system calls in a computerized system that implements a kernel, according to various embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

FIG. 1A illustrates system 10 operable for processing system calls in a computerized system that implements a kernel, according to an embodiment of the invention.

It should be noted that the term "computerized system" is not limited to software solutions or to hardware ones, and may be used to refer to any out of a variety that extends both to hardware and to the operating system and other software used. For example, various computerized systems in which kernel may be implemented are personal computers, servers, cellular telephones and other portable computerized systems, production machinery computers/networks, Microsoft Windows based systems, Linux based system, Android based systems, and so forth.

System 10 includes a kernel 200 that may operate in a highly privileged hierarchical protection domain (e.g. Ring 0 in x86 processors). In various implementations, the kernel mode may be supported by the hardware (and especially by the CPU, e.g. in Motorola 68000 processors), while in other implementations (e.g. in x86 processors) the privilege level is determined only in code segment level, and there is no flag that tells the CPU if it is executing in kernel mode or not.

System 10 also include one or more user mode applications 110 operating in user mode 100 (also denoted Ring 3), and/or in other hierarchical protection domain of lower privilege than the kernel—if more than two levels of hierarchy are implemented. Each of the user mode applications 110 may issue a system call that is transmitted to the kernel—possibly via an intermediating entity such as an application programming interface (API) 120 of the operating system (e.g. NTDLL in windows NT based operating systems), and/or an I/O interface 210 of the kernel.

System calls may be made to various kernel entities (denoted "destination kernel entity 230"; such as drivers), and may pertain to operation of various devices or components managed by those drivers—such as hardware components of the computerized system (e.g. central processor unit, memory, etc), or of other systems (e.g. network related system calls, or peripherals related system calls). In the illustration, a file system 242 (also denoted NTFS for a possible implementation of New Technology File System in MS windows) and an API for network interface cards (NICs) 244 (also denoted NDIS for Network Driver Interface Specification in a possible MS windows implementation) are illustrated as possible destination of the system call.

A dedicated computer program product 220 is operative between the user mode application 110 to the destination kernel entity 230, and process some or all of the system calls transmitted by the user mode application, to selectively enable (i.e. enable, prevent, partly enable, and so forth) transmission of the system call to its destination kernel entity 230, in response to a priority that it assigns to the system call in response to system call information as well as to rules that are used by the dedicated program product.

It is noted that dedicated computer program product 220 may include one or more dedicated drivers (such as the dedicated driver of method 500 discussed below, for example)—such as a dedicated mini-filter driver and a dedicated network driver that is dedicated to process system call that pertain to network activities.

It is noted that in some computerized system, drivers operating in the kernel are assigned different altitude, wherein the altitude of a driver (and especially of a minifilter driver in MS windows) defines a position of that driver relative to other drivers in the I/O stack of the system. It is noted that the altitude of one or more of the dedicated drivers operating in dedicated computer program product 220 may conveniently be set to facilitate an efficient processing of system calls as well as effective selective enabling of transmission of system calls to their respective destination kernel entities.

In some embodiments, the dedicated drivers of the dedicated computer program product 220 may have access to the system call relatively early during the in-kernel processing of the system call. However, some other drivers may still be effectively prioritized over the dedicated drivers—such as encryption/decryption drivers and so forth.

According to an embodiment of the invention, after receiving system call information that pertains to the system call, the dedicated computer program product 220 may process that information and in response select a rule out of a group of multiple rules that is matched to the system call. Execution of the rule by the dedicated computer program product 220 results in a priority that is assigned to the system call—and according to which the dedicated computer program product 220 may then selectively enable transmission of the system call.

It is noted that apart from the selective enablement of the transmission of system calls, the dedicated computer program product 220 may have other functionalities, some of which are elaborated below. For example, the dedicated computer program product 220 may make available to a user-mode agent 130 information regarding to actions taken for system calls, may modify the group of rules it is using for assigning priorities, and so forth.

It should be noted that while the disclosure pertains to a dedicated computer program product, in some embodiments the features disclosed in relation to the one or more dedicated computerized components may be incorporated into the kernel.

Figure 1B:
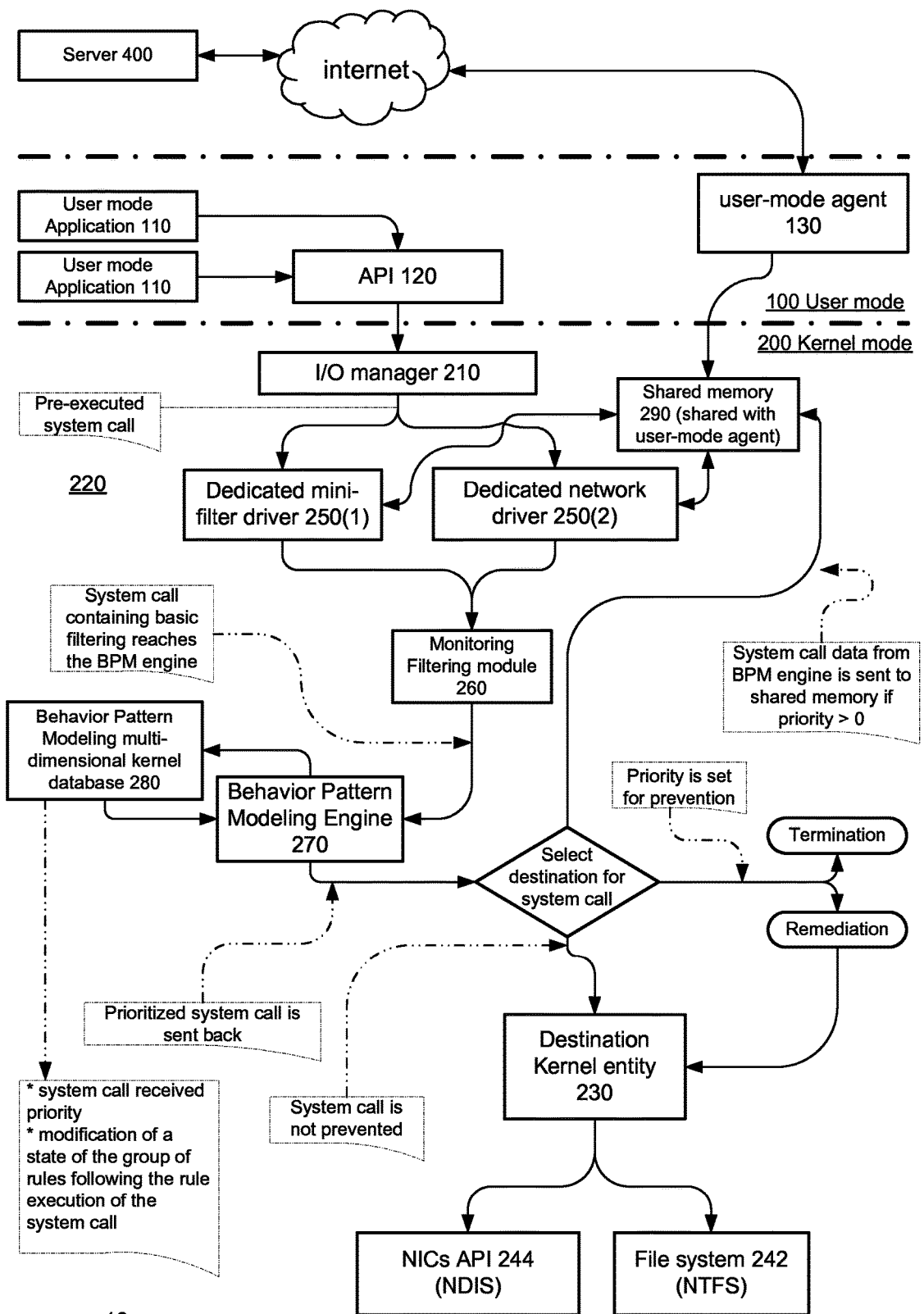

FIG. 1B is another illustration of system 10 according to an embodiment of the invention. Dedicated computer program product 220 may include various components, such as those illustrated in FIG. 1B, but not restricted to those components.

Dedicated computer program product 1B (that may be implemented by way of software, but may also be implemented at least partly by hardware or firmware) may include one or more dedicated drivers, such as dedicated mini-filter driver 250(1) and dedicated network driver 250(2). It is noted that if more than one dedicated driver is implemented, various allocation schemes may be implemented between the multiple dedicated drivers. For example, in the illustrated example one possible allocation scheme may be that the dedicated network driver 250(2) may handle all the system calls that pertain to network access (or at least those that are considered problematic, e.g. file copy to external repository), while dedicated mini-filter driver 250(1) would handle all other system calls (or at least those that are considered problematic, e.g. as determined by the type of the system call).

Each of the one or more dedicated drivers (which may conveniently operate in kernel mode) may operate to selectively enable transmission of system calls it processes to their respective destinations (e.g. other kernel drivers), in response to the priorities it assigns to the different system calls. The assigning of the priorities may be preceded by a selection a rule by the dedicated driver out of a group of rules that is stored in a kernel memory, in response to system call information that pertains to each of the system call.

The system call information may be gathered, for example, by monitoring and/or hooking of the system call by that dedicated, but this is not necessarily so. It is noted that various implementations of the dedicated driver are disclosed in relation to method 500, which each the dedicated driver may implement. According to an embodiment of the invention, the monitoring may be implemented by filter manager or by Network Driver Interface Specification (NDIS).

According to an embodiment of the invention, a monitoring filtering module 260 is implemented for determining rule selection parameters that are used for the selection of a rule out of a group of rules (this rule is later used for the assigning of the priority), wherein the determining of the rule selection parameters is made in response to the system call information. It is noted that the determining of some of all of the rule selection parameters may include merely extraction of system call information parameters, while the determining of other rule selection parameters may require processing of the system call information—and possibly also of another information (e.g. pertaining to a state of system 10 or a computerized entity within which monitoring filtering module 260 operates).

In some embodiments of the invention, the multiple selection parameters include at least one parameter responsive to a source of the system call and at least one parameter responsive to a type of the system call. It is noted that in some embodiments of the invention, some or all of the functionalities disclosed in relation to monitoring filtering module 260 may be implemented by the respective dedicated driver 250 (e.g. dedicated driver 250(1) and/or 250(2)).

According to an embodiment of the invention, dedicated computer program product may include a priority assigning engine 270 (also referred to as Behavior Patterns Map (BPM) engine 270) that is operative to assign a priority to the system call. It is noted that in some embodiments of the invention, some or all of the functionalities disclosed in relation to BPM engine 270 may be implemented by the respective dedicated driver 250 (e.g. dedicated driver 250(1) and/or 250(2)).

According to an embodiment of the invention, BPM engine 270 may assign the priority in response to a rule selected from a Behavior Patterns Map multi-dimensional kernel database 280. Such a database may be implemented in various ways, one of which is a multidimensional array (or other table structure) that implements a state machine, e.g. using the techniques disclosed below. In such a case, different rules may be available for selection in different states of the state machine (which may be implemented by activity flags for the different rules, for example), and an order according to which rules are considered for selection may also differ with time and with the different states.

It is noted that the selection of the rule may be implemented using the rule selection parameters indicated above. The selecting may also be responsive to other parameters, e.g. such that related to a state of the system, etc.

It is noted that, according to an embodiment of the invention, the BPM engine 270 may execute the rule to assign the priority to the system call. It is noted that in different embodiments of the invention, different number of priorities may be implemented (e.g. 2, 3, 5, 10, or more), and the priorities may have different meaning. For example, the priority assigned to the system call may result in that the system call may be transmitted or should be prevented and terminated, the system call is of medium risk, and should be processed according to user-defined security level, and so forth. The possible priorities may be, for example, binary (that may stand for a "enable transmission" and "do not enable transmission"), may be a range of priorities (e.g. integer number between 0 and 5), may be assigned with different actions (e.g. "block", "block and inform user", "block if certain additional conditions apply", "do not block but inform server", and so forth). The rule selected may actually indicate explicitly the priority that should be assigned to the system call, and may provide information by which the priority should be determined (e.g. with respect to additional factors).

According to an embodiment of the invention, the BPM engine 270 may execute the rule in order to modify the rule itself, or other rules in the BMP multi-dimensional kernel database 280 (especially by modifying a state of the activity flags of those rules within the database 280, but not only or necessarily so). It is noted that the rules may be stored in another type of data base, and that the database (be it BPM multidimensional data base 280 or other implementation) may be stored in the kernel, or in a memory space allocated to the kernel, and inaccessible to user-mode applications.

Once the priority was assigned to the system call, dedicated driver 250 (or BPM engine 270, if implemented) selectively enables its transmission to its destination (e.g. destination kernel entity 230), in response to the priority assigned to the system call.

If the priority assigned to the system call does not permit the transmission of the system call to its destination, various actions may be carried out. For example, such a system call may be terminated, or alternatively, it may be remediated to comply with aloud criteria. It is noted that the remediated system call may need to be scrutinized again by the BPM engine 270, but this is not necessarily so. In some implementations, the operation requested in the system call may be blocked, mitigated, changed or redefined in some way.

According to an embodiment of the invention, dedicated computer program product 220 (and/or the dedicated driver) may have access to shared memory 290 that it shares with user-mode agent 130. Using shared memory 290, BMP engine 270, dedicated driver 250, or other dedicated modules may make information regarding the system call and the priority assigned to it available to a user mode module that operates outside the kernel. Such information may be used for reporting to an agent that is active in the user mode (ring 3) regarding some or all of the service calls and/or the operations carried out. In some embodiments of the invention only system calls to which a priority that exceeds a predetermined threshold was assigned are reported. According to an embodiment of the invention, the agent that is active in the user mode communicates with a server 400 over a network such as the internet (WAN) or Local Area Network (LAN).

Server 400 may be, for example, a corporate network server (connected to the user mode agents 130 of multiple users) over the corporate network, or a central server connected to user mode agents 130 multiple subscribers over the internet.

The server 400 may be operative, for example, to manage all the events reported by dedicated computer program product 220 (and especially by BPM engine 270, and/or by dedicated driver 250).

It is noted that server 400 (or other remote server) may be used to provide the group of rules (or information indicative of which) to the dedicated driver 250 and/or to BPM engine 270.

According to an embodiment of the invention, server 400 may initiate a connection with user-mode agent 130 by performing an agent-server handshake. During this step, the user-mode agent 130 may be identified and approved by the Server 400, may provide local machine details, such as IP, host name, etc., and may also receive the latest version of rules data, in case it is not the same version used by dedicated computer program product 220.

Figure 2A:
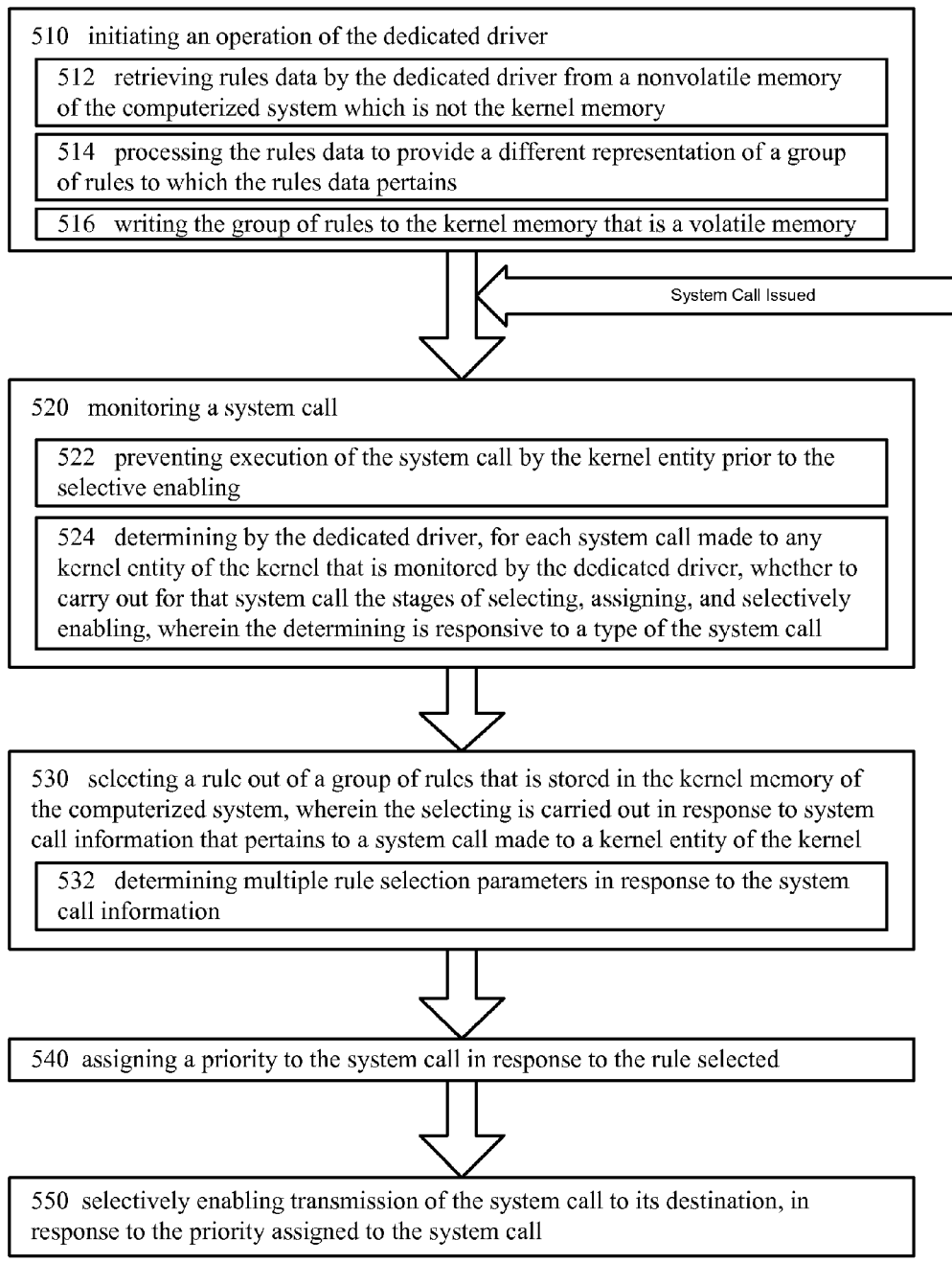
FIGS. 2A and 2B illustrates a method for processing system calls in a computerized system that implements a kernel, according to various embodiments of the invention.

FIG. 2A illustrates method 500 for processing system calls in a computerized system that implements a kernel, according to an embodiment of the invention. Referring to the examples set forth in the previous drawings, method 500 may be implemented by dedicated driver 250 of FIG. 1B, and/or by a dedicated driver being run by processor 620 of FIG. 3. It is noted that embodiments of the invention that are disclosed in relation to FIGS. 1A, 1B, and 3 may be implemented, mutatis mutandis, in method 500 even if not explicitly so, and vice versa.

As aforementioned, kernel may be implemented in various computerized systems—a variety that extends both to hardware and to the operating system and other software used. For example, various computerized systems in which kernel may be implemented are personal computers, servers, cellular telephones and other portable computerized systems, production machinery computers/networks, Microsoft Windows based systems, Linux based system, Macintosh based systems, Android based systems, and so forth.

As discussed below, it is noted that system calls may be made by various components of the computerized system (especially by programs operating in a relatively less secure level, such as user mode level (or ring 3) in windows based applications). System calls may be made to various kernel entities (such as drivers), and may pertain to operation of various devices or components managed by those drivers—such as hardware components of the computerized system (e.g. central processor unit, memory, etc), or of other systems (e.g. network related system calls, or peripherals related system calls).

It is noted that the stages of method 500 may be carried out (and may be implemented by) a dedicated driver operating in kernel mode. Referring to the examples set forth in the previous drawings, such dedicated driver may be, for example, dedicated driver 250(1), dedicated driver 250(2), or a dedicated driver being run by processor 600. It is note that such a dedicated driver may be loaded during a starting up of the computerized system, and may remain operative even when the system is not in a fully operational state (e.g. when the system is in full or partial sleep-mode, when no user is logged into the system, when the system is in a power saving mode, and so forth). Conveniently, the dedicated driver may remain operational until a shutting down of the system.

It should be noted that in other embodiments of the invention, the stages of method 500 may be carried out by another one or more entities. For example, in some computerized system, internal kernel entities may be implemented within the kernel itself (and not as an external driver). In another embodiment the method may be carried out by a combination of a dedicated driver operating in kernel mode, and of another entity operating in user mode, or other less secure level of the operating system.

Also, in some embodiments, the stages of method 500 may be carried out by a group of kernel drivers and/or other software modules operating in the kernel (such as the monitoring filtering module and the Behavior Patterns Map engine of FIG. 1B). It is noted that it will be clear to a person who is skilled in the art that implementing method 500 by multiple dedicated modules operating in the kernel is within the scope of the disclosure.

Method 500 facilitates a selective enabling of transmission of one or more system calls to their respective destinations (see for example stage 500). In such a selective enabling of transmission, some system calls may be transmitted to their respective destinations (e.g. if those system calls are appreciated by the dedicated driver as harmless or having a relatively low risk), while the transmission of other system calls may be prevented (e.g. if those system calls are appreciated by the dedicated driver as potentially harmful).

In order to facilitate the selective enabling of transmission of the system call (which may include prevention of such transmission), method 500 may include stage 520 of monitoring system call. According to an embodiment of the invention, the monitoring of the system call may be implemented by way of monitoring that system call, hooking it and/or intercepting it.

It is noted that, according to some embodiments of the invention, stage 520 is carried out for all of the system calls made to the kernel, or at least all the system calls that qualify for one or more conditions or criteria (e.g. which are of a given type). According to some embodiments of the invention, all the system call that qualify for one or more other conditions or criteria are not monitored, hooked, and/or intercepted. For example, the monitoring according to some embodiments of the invention may not be applied to system calls of another given type (e.g. that is not expected to be substantial in any harmful scheme or sequence of system calls).

Method 500 may also include stage 522 of preventing execution of the system call by the kernel entity prior to the selective enabling (of stage 550). According to an embodiment of the invention, stage 522 includes preventing of transmission of the system call to the kernel entity prior to the selective enabling (of stage 550). It is noted that, in order to enable such a real-time operation (in which the transmission of valid system calls may only be delayed for very short period of time), the stages following stage 522 should be carried out fast. Implementations that were found by the inventors to enable such fast processing of systems calls by the dedicated driver operating in the kernel mode are discussed below.

It should be noted that stage 520 and 522 may be initiated before the selecting of stage 530.

It is noted that transmission of system calls may be prevented for various reasons, in various embodiments of the invention. For example, system calls may be prevented if they originate in a malware, but also if they originate in a poorly designed software which may harm the computerized system. System calls may also be prevented even if they originate in legitimate applications, e.g. if it may harm the computerized system (e.g. due to a physical condition the system is at), if the computerized system has overloading of computational tasks, if the computerized system undergoes a sensitive process (e.g. defragmentation of the hard-drive), and so forth.

Stage 500 may start with stage 510 of initiating an operation of the dedicated driver. Conveniently, the initiating may be carried out during a starting up and/or initiation of the computerized system (e.g. when the operating system and its components are loading). Generally (though maybe not necessarily), the sooner the dedicated driver load, the more security it can offer. It is noted that in different embodiments of the invention, the timing of the initiation of the operation of the dedicated driver in relation to the initiation of other computerized system entities (e.g. of other drivers) may vary.

During the operation of the dedicated driver, and possibly during its initiation, stage 512, 514, and 516 may be carried out. In some embodiments of the invention, stages 512, 514, and/or 516 may be repeated several times during a continuous operation of the dedicated driver—for example, for updating the data from time to time.

Stage 512 includes retrieving rules data by the dedicated driver from a nonvolatile memory of the computerized system which is not the kernel memory. For example, the retrieving may include retrieving the rules data from a file stored on a hard drive of the computerized system. It is noted that in other embodiments, the retrieving may include retrieving the rules data (that pertains to rules used by the dedicated driver during its routine operation, e.g. as discussed below) from an external entity such as a server, using a network connection.

In a combination, the rules data may be acquired from one or more external entities (e.g. over the internet)—either by the dedicated driver or by another entity such as a user mode entity—then stored on the nonvolatile memory, and retrieved from there by the dedicated driver when needed. It is noted that in some embodiments, the retrieved rules data may be encrypted, in which case the dedicated driver may decrypt it prior to further processing it.

According to an embodiment of the invention, the rules data is generated by an external entity that can generate rules data, such as an external security authority (e.g. a security solutions provider which may be a commercial company, may be a provider of the operating system, and so forth). The rules data may be updated from time to time (e.g. when a new threat is discovered, when a new feature is developed for the computerized system, and so forth). It is noted that the ways in which the rules data is generated extend out of the scopes of this disclosure, as a great deal of various ways can be used for this end.

In just few examples, the rules to which the rules data pertain may be developed by attempting to recognize patterns that are used in ordinary operations in the computerized system (e.g. a proper way of updating the registry) as well as patterns that are typical of hostile actions (such as taking advantages of a known security lapse in a used program). Other techniques may include automatic (or computer aided) analysis of series of operations that are taking place in one or more computerized systems protected according to the disclosed solutions, and generation of the rules data at least partly in response to a result of the analysis. Yet other technique that may be used is analyzing computerized systems that were already breached, and determining how to overcome a repetition of such breaching. Yet other technique might be to analyze and find the common denominators of several attacks and determine how to stop their conduct and so forth. It is noted that the techniques proposed above are optional, and any one or more of them may be implemented in various embodiments of the invention, while in some embodiments of the invention other techniques may be implemented.

It is noted that at least some of the information used for the determining of the rules data may be gathered by trusted software that may issue reports of operations attempted and prevented by the dedicated driver (wherein in some embodiments of the invention, the dedicated driver may inform the entity that issued the system call if the system call was blocked or otherwise treated in a non-regular way, wherein such information may include an identity of the dedicated driver that prevented the regular execution of the system call, but this is not necessarily so).

Stage 514 includes processing the rules data to provide a different representation of a group of rules to which the rules data pertains (and which is discussed in more details below). For example, the rules data may be written in a user comprehendible structure (such as using a dedicated programming language designed for Behavior Patterns Map), while the processing includes converting the user comprehendible rules data to a dedicated data-structure such as Behavior Patterns Map multi-dimensional kernel database 280 of FIG. 1B. It is noted that if the rules data includes data in a representation suitable for the routine operation of the dedicated driver, stage 514 may be skipped.

In some embodiments of the invention, the processing of the rules data to provide the different representation of the group of rules (that are used by the dedicated driver during its routine operation) may be carried in response to information that is not included in the rules data. For example—such information may pertain to the specific computerized system in which the dedicated driver operates—e.g. addresses used to access given resources, number and types of resources (e.g. of hard-drives), security definitions, and so forth. Thus, for example, the rules data that may be generated by a central remote location (e.g. a computer security company that identify threats and generates rules data accordingly) can be, in such an embodiment of the invention, be modified and adapted to the specific computerized system.

It is noted that stage 514 may be considered, at least in some embodiments of the invention, as compiling of the rules data, by the dedicated driver in kernel mode. According to an embodiment of the invention, the dedicated driver may compile in kernel mode other types of data as well.

Stage 516 includes writing the group of rules (possibly the different representation of the group of rules, if implemented) to the volatile kernel memory (e.g. residing in a random access memory (RAM) of the computerized system). Conveniently, during its routine operation, the dedicated driver routinely access (and possibly modify) the group of rules residing in the volatile memory.

According to an embodiment of the invention, the dedicated driver writes the group of rules to the volatile memory as a data structure such as Behavior Patterns Map multi-dimensional kernel database 280, discussed in relation to FIG. 1B.

Conveniently, stage 512, 514 (if implemented) and 516 (and at least a first instance of those stages, if they are repeated) is carried out before a routine operation of the dedicated driver begins (e.g. before stage 530 of selecting of a rule out of the group of rules).

Method 500 includes stage 530 of selecting a rule out of a group of rules (which is the group of rules of stages 514 and/or 516, if implemented) that is stored in the kernel memory of the computerized system, wherein the selecting is carried out in response to system call information that pertains to a system call made to a kernel entity of the kernel.

It is noted that in different embodiments of the invention, the system call information may be gathered in various ways—such as by a monitoring and/or hooking of the system call be the dedicated driver, or intermediating the system call.

The selecting of the rule out of the group of rules may be implemented in various manners, in different embodiments of the invention. In some embodiments of the invention, the selecting may be further responsive to other factors that do not depend on the system call information.

According to an embodiment of the invention, method 500 further includes stage 532 of determining multiple rule selection parameters in response to the system call information—wherein the determining may include selecting some or all of the rule selection parameters that are included in the system call information (if at all), and/or processing some or all of the system call information, to determine rule selection parameters.

According to an embodiment of the invention, at least one of the multiple rule selection parameters is a parameter responsive to a source of the system call (e.g. an identity of the application that generated the system call). It is noted that some rule selection parameters used for the selection of the rule may pertain to the type of application (e.g. Microsoft Word, Firefox, any hard-disk defragmentation application, any anti-virus software, etc.), but in other embodiments no rule selection parameters used for the selection of the rule pertains to the type of application (e.g. while the dedicated parameters may be interested that a certain hard-disk defragmentation application is the one that sends a certain series of system calls, the fact that it is a defragmentation application and/or is the specific defragmentation program used may not be considered by the dedicated driver).

According to an embodiment of the invention, at least one of the rule selection parameters is responsive to a type of the system call (e.g. writing to disk, reading from memory, etc.).

It is noted that many other parameters may be also determined and used by the dedicated driver during the selecting. For example, another rule selection parameters that may be used may pertain to a content (or payload) or the system call (e.g. the content requested to be written to the hard-disk), to a timing of the system call (e.g. in respect to previous system calls), and so forth.

According to an embodiment of the invention in which stage 532 is implemented, the selecting of stage 530 may be responsive to the multiple rule selection parameters. It is noted that some rule selection parameters may be determined but not used. It is further noted that in some embodiments of the invention, it is impossible or at least inefficient to know in advance if some of the rule selection parameters will be required for the selection. For example, in an embodiment of the invention in which a state machine is implemented for the selection of the rule, the type of rule selection parameters may depend on the specific state in which the state machine is at the time of the selecting.

The process of rule selecting may be complicated, and some implementations of it are discussed below more elaborately. However, a rule that is selected according to the present method pertains at least to a selection of a priority to the system call (e.g. the system call may be transmitted or should be prevented and terminated, the system call is of medium risk, and should be processed according to dedicated security scheme—and even, in some embodiments of the invention, according to a level selected by the user—e.g. a strict conservative approach, a low security level, etc.—and so forth). It is noted that the rule may actually indicate explicitly The priority that should be assigned to the system call, and may provide information by which the priority should be determined (e.g. with respect to additional factors).

As will be discussed below in more details, the rule may include additional information. For example, the rule may include information that affects whether or not information regarding the system call and the priority assigned to it will be provided to an external entity (e.g. a user mode monitoring application). The rule may also include instruction to modify the way in which rules will be selected for system calls in the future. In an example that will be disclosed in more detail below, the rule may, by way of example, include an instruction to make the rule itself unavailable for selection for other system calls.

According to an embodiment of the invention, the selecting of the rule is responsive to dynamic variables (of the rule) that are determined after the processing of the rules data is complete (for example during runtime, e.g. parameters such as path, process name, pattern). Such variables may be determined in response to another rule that was matched for another system call. For example, if an early system call included a request pertaining to a certain file, information of that file may be saved as a dynamic variable, and retrieved in order to determine whether another system call that includes a request pertaining to the same file should be matched to a first rule or a second rule.

Stage 540 of method 500 includes assigning a priority to the system call in response to the rule selected. It is noted that the priority assigned to the rule may be one selected out of a predetermined number of priorities which may be assigned to system calls in the specific implementation. For example, the possible priorities may be binary (that may stand for a "enable transmission" and "do not enable transmission"), may be a range of priorities (e.g. integer number between 0 and 5), may be assigned with different actions (e.g. "block", "block and inform user", "block if certain additional conditions apply", "do not block but inform server", and so forth).

Stage 550 of method 500 includes selectively enabling transmission of the system call to its destination, in response to the priority assigned to the system call. It is noted that the selective enabling of transmission in stage 550 may include enabling of the transmission of the system call and also not-enabling such a transmission. It is noted that additional alternatives may also be implemented. For example, so system call may be transmitted along with an additional information (e.g. indicating that the information indicated in the system call should be written to a substitute memory address), the content of the system call may be modified before transmission (e.g. reducing the payload, modifying a memory address requested, and so forth).

As aforementioned, the action selected for the selective enabling of the system call to its destination is responsive to the priority assigned. It is further noted that this action may also be selected further in response to additional parameters (e.g. security definitions defined by the user, condition or state of the computerized system, and so forth).

It should be noted that in some embodiments of the invention, the selectively enabling of transmission of the system call may include preventing transmission of the system call that is issued by a process otherwise privileged by the kernel by access to the destination.

According to an embodiment of the invention, the method may include (e.g. as part of the selectively enabling of transmission of the system call) a prevention of an attack on the computerized system. According to an embodiment of the invention, the method may include (e.g. as part of the selectively enabling of transmission of the system call) a prevention of an intrusion to computerized system by an unauthorized entity.

In many systems that implement a kernel, different processes have different privileges for carrying out different actions in the systems, to access different system resources, and so forth. However, a process that is privileged to access one or more system resources in given ways may still utilize those privileges in undesired manners (e.g. manners that may harm the computerized system or connected system)—unless such undesirable actions are identified selectively prevented, by the selective enablement of transmission of the system call.

According to an embodiment of the invention, the selectively enabling is carried out by the dedicated driver that is run by a processor of the computerized system, wherein the selectively enabling includes enabling transmission of the system call to a hardware device of the computerized entity, wherein execution of the system call by the hardware device results in modifying a state of the hardware device (e.g. modifying an electronic state of a volatile memory, modifying a magnetic state of a hard-disk, and so forth).

It is noted that in some embodiments of the invention, all of the system calls in the computerized system may be processed according to each of the stages 530, 540 and 550, while in other embodiments only some of the system calls in the computerized system are processed according to each of the stages 530, 540 and 550, while others are processed according to only some (one or more) of those stages, or not processed according to any of those stages.

For example, in some embodiments of the invention, some system calls (classified by type, origin, destination, and/or other criteria) may not be fully processed—for example, if it is not expected that such calls would pose any threat to the computerized system. It is noted that the information regarding which system calls should be fully processed (i.e. for which at least stages 530, 540 and 550 should be applied) and for which not may be included in the rules data, or in another data package retrieved (e.g. from the external server, the external security authority, etc.). It is further noted that the dedicated driver may also decide which system calls would not be fully processed based on information gathered during operation (and which is not received from a source external to the computerized system).

According to an embodiment of the invention, all of the system calls made to the kernel are noted by the dedicated driver, which then determines which of them should be fully processed. For example, out of 284 types of system calls implemented in some MS windows operating systems, the dedicated driver may apply full processing to 30 types of those calls, while system calls of other types may be processed only to determine that they are of a different type, and no preventing of those system calls is required.

According to an embodiment of the invention, method 500 may include stage 524 of determining by the dedicated driver, for each system call made to any kernel entity of the kernel that is monitored by the dedicated driver, whether to carry out for that system call the stages of selecting, assigning, and selectively enabling, wherein the determining is responsive to a type of the system call.

The determining of stage 524 may follow the monitoring of stage 520, if implemented, but this is not necessarily so. It is noted that if a result of the determining of stage 524 is that negative, stage 550 may be carried out for enabling transmission of the system call to its destination, in response to the priority assigned to the system call (especially if means for temporary prevention of such transmission were taken, such as in stage 522).

In other embodiments, stage 524 may precede 520 (if implemented), so that only the functions that are relevant (e.g. that pertain to file system, process management, registry, networking, etc.) are hooked in stage 520.

According to an embodiment of the invention, method 500 may include determining by the dedicated driver, for each system call made to any kernel entity of the kernel that is monitored by the dedicated driver, whether to carry out for that system call the stages of selecting, assigning, and selectively enabling, wherein the determining is responsive to a type of the system call.

Figure 2B:
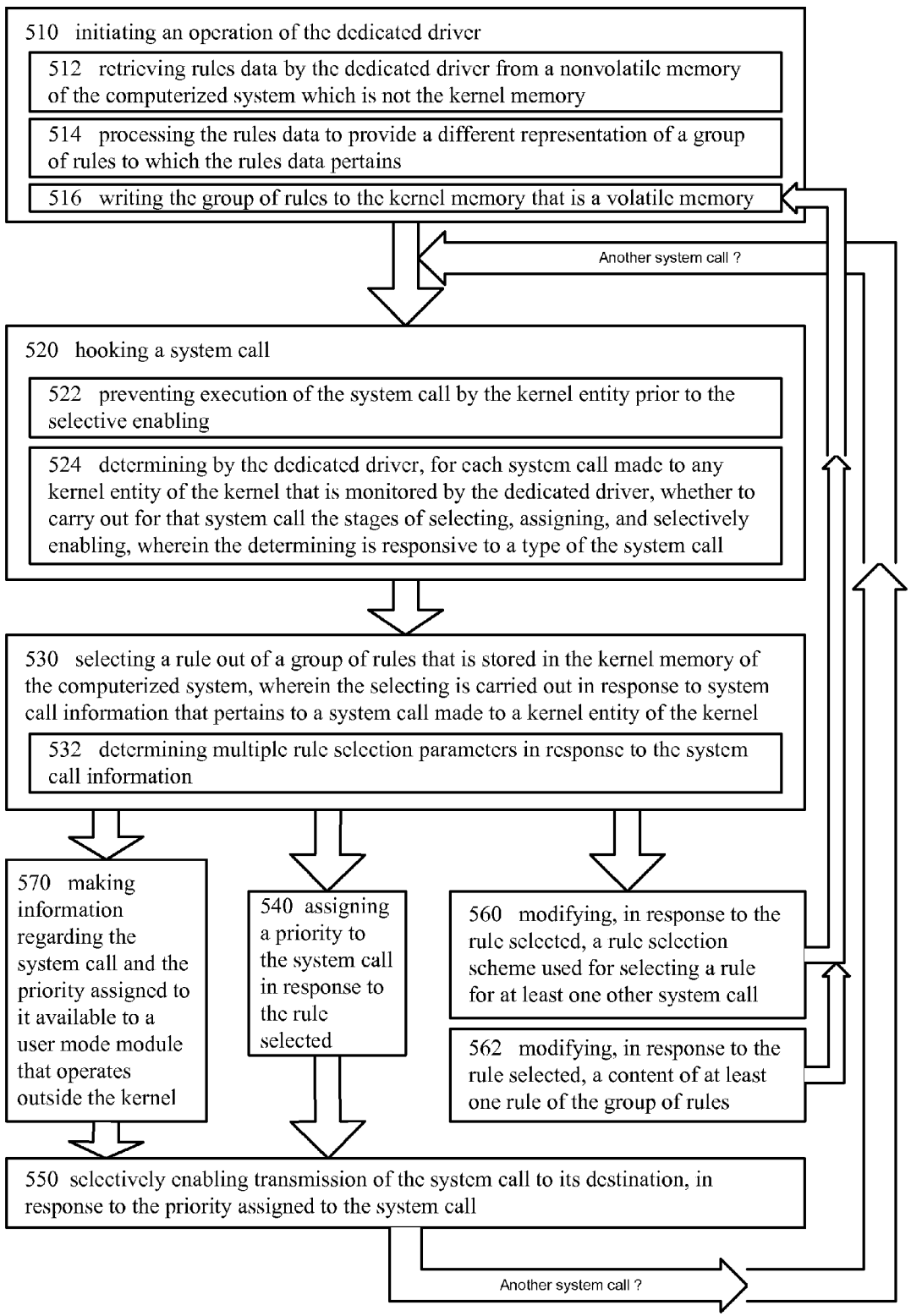

FIG. 2B is an additional illustration of method 500 for processing system calls in a computerized system that implements a kernel, according to an embodiment of the invention.

Selecting a rule in response to the system call information enables assigning a priory for the respective system call, and selective enabling of the transmission of that system call to its destination. More complex processing of system calls involve modification of the group of rules during operation. In different embodiments of the invention, such modification may be done in different ways.

While possible types of rules are disclosed below, it is noted that while not necessarily so—each rule may generally apply to one type of system call and to a set of parameters distinct than those of another rules that pertain to the same type of system call. Each rule may conveniently indicate the priority that should be assigned to that system call, as well as other operations that should be carried out.

However, as mentioned above, in some embodiments of the invention it may be desired that different systems calls of the same type and having the same or similar sets of parameters will not be treated the same in each time. For example, some operations requested by system calls should not be carried out many times in a row, if another operation was not carried out between two instances. Therefore, continuing the same example, after enabling transmission of a first such system call, the rules of the group of rules should be amended to prevent the transmission of a second such system call, before another operation is carried out.

While the rules may be modified in various ways according to various embodiments of the invention, in some embodiments of the invention the rules of the group of rules are being modified in response to content of the selected rule. That is, at least some of the rules of the group may include instructions for the modifying of one or more rules out of the group of rules, if selected.

According to an embodiment of the invention, the selecting of the rule (in stage 530) may be followed by stage 560 of modifying, in response to the rule selected, a rule selection scheme used for selecting a rule for at least one other system call.

It is noted that method 500 may also include—either in addition to the modifying of stage 560, or instead of it—stage 562 of modifying, in response to the rule selected, a content of at least one rule of the group of rules (for example, modifying a priority that should be assigned to the system call according to that rule).

It is noted that the modifying of the rule selection scheme may be carried out in different ways. For example, the modifying of stage 560 may include modifying the set of parameters used for the selection of one rule over another.

According to an embodiment of the invention, the modifying of stage 560 includes modifying the group of rules by modifying which rules of the group of rules are available for selection for the at least one other system call.

For example, while in a first state, the carrying out of a certain disk-writing operation may be regarded harmless, the very same action may be harmful if carried out in a second state—after another operation was carried out. Therefore, in such case a rule that may authorize the carrying out of the other operation (which is not harmful by itself) may make a rule that pertains to the certain disk-writing operation available, so that this rule will prevent the transmission of the system call to its destination.

It is noted that a rule may also include instructions to make the very same rule available or unavailable for selection after this rule is executed.

As aforementioned, the stages of selecting a rule, assigning a priority and selectively enabling transmission may be repeated for multiple system calls, and possibly also for all the system calls that are made to the kernel (or at least to all the system call that qualify to a predetermined criteria). According to an embodiment of the invention, some or all of those stages may be repeated for a series of system calls (and especially, the stage of selecting a rule is repeated for a series of system calls).

It is noted that the system calls of a series of system calls are not necessarily received and processed in a consecutive manner. For example, if the system calls that are received by the kernel within a given duration may be enumerated 1, 2, 3, 4, 5, 6, 7, 8, 9, and 10—a series of system call may consist of system calls 2, 3, 4, 6, 9, and 10.

A series of system calls may be defined as a series for different reasons. For example, a series of system calls may be regarded as a series if it pertains to a series of operations requested from one or more entities, which are operative toward a single goal. For example, the goal may require allocating disk space in a non-volatile memory, reading information from a volatile memory, writing the read information to the allocated disk space, and releasing the allocation for any unrequited disk space. Some such goals may be generally safe (e.g. standard operations carried out in the computerized system) while others may be regarded harmful (e.g. exploiting a known safety failure).

It should however be noted that a series of system calls is not necessarily identified or considered as a series by the dedicated driver, or by any other entity. In some embodiments of the invention, the series of action is merely a conceptual frame work (that may be used, for example, when determining the rules of the group). It is further noted that a series of system calls may belong to a group of such series. For example, if two operations may be carried out in any order within the series, all the series in which those operations appear in any order may belong to a group of series. Likewise, if a series of operations may conclude with one operation that is allowable or with another that should be prevented, then those two series may belong to the same group of series. It is again noted that a group of series may be a conceptual framework, and is not necessarily acknowledged by the dedicated driver.

Referring to an embodiment of the invention in which the stage of selecting a rule is repeated for a series of system calls, according to an embodiment of the invention, an instance of stage 530 that includes selecting of an initiating rule for a first system call of the series (which may preferably be the first system call of the series) may be followed by an instance of stage 560 that includes making rules that pertain to other system calls of the series available for selection—usually in response to a content of the initiating rule. It is noted that other system calls may be made unavailable for selection in response to the initiating rule.

The initiating rule may pertain to a system call (or the respective operation) that starts a series of operations that may be either allowed or prevented (depending on the unfolding of the series). It should be noted that the initiating rule itself may be made available or unavailable for selection in response to its own selection (for example—if only one instance of the series can be taking place at a time, the initiating rule may be rendered unavailable until an exit condition is met for the series). It is noted that the initiating rule may be made available by another rule if previously unavailable for selection. One such occasion may happen when the initiating rule is an initiating rule for a sub-series within a larger series.

According to an embodiment of the invention, a series of rules is associated with the series of system calls, wherein each rule of the series corresponds to a system call of the series of system call. The first rule selected and implemented is the initiating rule, the last rule carried out is the terminating rule, and other rules of series of rules are intermediate rules (that may have associated order within them, but not necessarily so). It is noted that the rules of the series may belong to a series-related group of rules, which corresponds to the aforementioned group of series of system calls (that pertain to the same goal)—but this is not necessarily so. If so, the series-related group may include rules that are not selected—but could have been selected—as part of a series of operations that correspond to the system calls.

According to an embodiment of the invention, a selecting of a terminating rule for another system call of the series (wherein it is noted that the dedicated driver is not necessarily aware that this is a terminating rule—in some embodiments the dedicated driver may be indifferent to the function of the various rules) may be followed by making rules that pertain to other system calls of the series—other than the initiating rule unavailable. That is—in some embodiments of the invention, once the terminating rule have been selected and an action was carried out according to its content—the series has concluded, and its stages (if applicable) and the corresponding rules should be made unavailable for selection—because the series may begin only from the initiating rule. A selection of the initiating rule a second time (if it is available) may start the series over. It is further noted that some series may not reach the terminating rule during an operation of the dedicated driver.

According to an embodiment of the invention in which a series of system calls is handled, out of the system calls of the series the stages of assigning a priority and selectively enabling transmission may be carried out only for the system call for which the terminating rule is selected. That is—in some embodiments of the invention only the system call for which the terminating rule is selected is assigned a priority, while the system calls preceding it in the series are just enabled. It should be noted that the series-related group of rules may include multiple optional terminating rules (e.g. if multiple operations may harm the computerized system), but only one is selected before the concluding of the series.

Referring to stage 560 again, it is noted that the modifying of the rule selection scheme may be implemented by modifying the group of rules that is stored in the kernel memory. This may be done in various ways, and it is noted that according to some embodiments of the invention, any modifying of the group of rules following a selection of a rule does not modify a storage size of the group of rules in the kernel memory.

For example, the making of rules available or unavailable for selection may be implemented by modifying a state of an activity flag (e.g. activity bit) that indicates whether the rule (which may be stored as a single data-structure element—DSE) is available for selection or not. Such modification may be implemented without modifying the overall storage size of the group of rules in the kernel memory. Other modifications may include, for example, modifying the parameters by which a rule is selected—as long as those modifications are implemented without changing the storage size of the group of rules.

A person who is of skill in the art would appreciate that modifying the group of rules without modifying the storage size required for it may facilitate a continuous operation of the dedicated driver and selecting of multiple rules by it—while the time required for selection of rules does not get longer and longer during the operation of the dedicated driver.

It is noted that the operation of the dedicated driver may be sufficient for effective management of system calls. However, it may be desirable to inform other software and/or a user or a supervisor—about the priorities assigned to the various system calls, about patterns identified (e.g. as part of series), and so forth. Such a software and/or a user or a supervisor may operate on the computerized system—but may also operate in a remote system (e.g. in a supervision center connected to the computerized system over the internet or a corporate network).

According to an embodiment of the invention, method 500 may include stage 570 of making information regarding the system call and the priority assigned to it available to a user mode module that operates outside the kernel. For example, stage 570 may include reporting to an agent that is active in the user mode (ring 3) regarding some or all of the service calls and/or the operations carried out. In some embodiments of the invention only system calls to which a priority that exceeds a predetermined threshold was assigned are reported. According to an embodiment of the invention, the agent that is active in the user mode communicates with a server over a network.

It is also noted that in some embodiments of the invention, an entity that receives such a reporting (or other information regarding the system call and the priority assigned to it) may use such information to generate an alert, to carry out additional actions, and possibly also to generate new rules or to modify existing ones according to the information received. However—even if rules are modified and generated—they would usually not apply to the current operation of the dedicated driver.

It is noted that the dedicated driver may prevent exploitation of security breaches (by preventing suspicious patterns, for example)—but the security breach itself may be identified—and cured—in various embodiments of the invention, by the agent, by the server, and/or by another software component.

Figure 3:
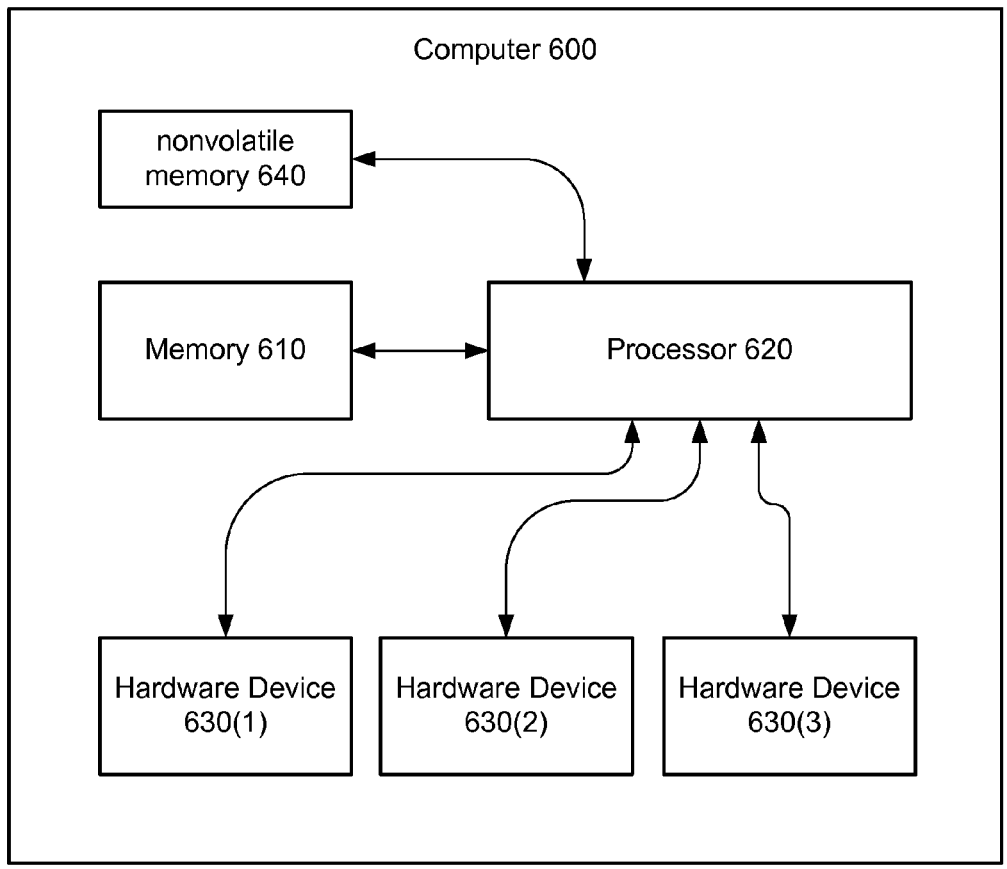
FIG. 3 illustrated a computer, according to an embodiment of the invention.

FIG. 3 illustrated computer 600, according to an embodiment of the invention. It is noted that computer 600 may be the computerized system referred to in the description of method 500, but this is not necessarily so. It is also noted that computer 600 (and especially a processor of it, and especially a processor of it that runs a dedicated driver in kernel mode) may implement method 500, or at least parts of it, mutatis mutandis. Computer 600 may also implement (e.g. by executing by a processor, and/or a memory of the computer) the techniques discussed in relation to FIGS. 1A and 1B, even if not explicitly elaborated.

It is noted that computer 600 implements a kernel. Generally, processes in the kernel are not directly accessibly to user-mode processes other than by the way of system calls.

Computer 600 includes at least processor 620, and memory 610, and possibly also one or more hardware device 630 to which the system calls pertain. It is noted that computer 600 may have more than one processor 620 (wherein one or more of the processor may implement the some or all of the features of processor 620 disclosed below) and/or a processor with multiple cores. According to an embodiment of the invention, computer 600 may have more than a single memory 610 (e.g. multiple memory chips or modules). It is also noted that memory 610 may be a non-volatile memory, but this is not necessarily so.

Processor 620 is configured to run processes in kernel mode and to run other processes not in kernel mode. It is noted that processor 620 may have a hardware implementation of "kernel mode" (such as the Motorola 68000 that has two processor modes "built into" the CPU, wherein a flag in a status register tells the CPU if it is currently executing in user-mode or supervisor-mode), but this is not necessarily so. For example, according to an embodiment of the invention, the privilege level of the code segment that is currently executed by processor 620 determines the privilege level of the program executed by processor 620 and whether it is in kernel mode or not. Apart from kernel mode there may be one or more other modes or "rings".

Processor 620 is configured to run in the kernel mode at least the following processes: (a) selecting a rule out of a group of rules that is stored in a kernel memory of the computer 600 (the kernel memory may be a storage portion of memory 610 that is allocated only to kernel operations), in response to system call information that pertains to a system call made to a kernel entity of the kernel; (b) assigning a priority to the system call in response to the rule selected; and (c) selectively enabling transmission of the system call to a hardware device 610 of the computerized entity (or to a hardware device of another entity such as a connected peripheral, but this is usually also mediated by a hardware device of computer 600) in response to the priority assigned to the system call.

According to an embodiment of the invention, the processor 620 may be configured to run in the kernel mode a process (e.g. as part of the process of selectively enabling transmission of the system call, but not necessarily so) of preventing an attack on the computerized system. According to an embodiment of the invention, the processor 620 may be configured to run in the kernel mode a process (e.g. as part of the process of selectively enabling of transmission of the system call, but not necessarily so) of preventing an intrusion to computerized system by an unauthorized entity.

Hardware device 630 is configured to execute the system call, wherein execution of the system call by the hardware device 630 results in modifying a state of the hardware device. For example, if the hardware device is a hard drive or other non-volatile memory, then the execution of the system call may result in data read from the hard-drive or written to it (e.g. by modifying a magnetic state of it, an optical state of it, an electronic state of it, and so forth). If the hardware device is a graphical interface than the execution of the system call may result an electronic modification of it for modifying the displayed picture.

It is noted that memory 610 (which may be a volatile memory) may itself be a hardware device 630.

According to an embodiment of the invention, processor 620 may be further configured to run in the kernel mode a process of monitoring the system call prior to the selecting, and to prevent execution of the operation requested in the system call by the kernel entity (and possibly also transmission of the system call to the kernel entity) prior to the selective enabling. The process of monitoring may include hooking and/or intercepting the system call.

Processor 620 may process the system call in real-time (or near-real-time), so as not to cause any substantial delay in the manner in which computer 600 operates.

According to an embodiment of the invention, processor 620 may be further configured to run in the kernel mode a process of determining, for each system call made to any kernel entity of the kernel, whether to carry out for that system call the stages of selecting, assigning, and selectively enabling, wherein the determining is responsive to a type of the system call.

In some embodiments of the invention, also system calls that are determined to be relevant are hooked for processing and selectively enabling their transmission. Such systems calls may be, for example, such that pertain to file system, process management, registry, networking, etc.

According to an embodiment of the invention, processor 620 may be further configured to run in the kernel mode a process of determining multiple rule selection parameters in response to the system call information; wherein the multiple selection parameters include at least one parameter responsive to a source of the system call and at least one parameter responsive to a type of the system call; wherein the selecting is responsive to the multiple rule selection parameters.

According to an embodiment of the invention, processor 620 may be further configured to run in the kernel mode a process of modifying in response to the rule selected, a rule selection scheme used for selecting a rule for at least one other system call. The modifying may include modifying the group of rules by modifying which rules of the group of rules are available for selection for the at least one other system call.

The modifying of the rule selection scheme may be implemented by modifying the group of rules that is stored in memory 610. The group of rules may be stored in memory 610 in various manners, e.g. as a Behavior Patterns Map (BPM) multi-dimensional kernel database 280, such as discussed in relation to FIG. 1B.

According to an embodiment of the invention, processor 620 may be configured to: (a) repeatedly run the selecting process for a series of system calls; (b) run in the kernel mode a process of making rules that pertain to other system calls of the series available, after a selecting of an initiating rule for a first system call of the series; and (c) run in the kernel mode a process of making rules that pertain to other system calls of the series other than the initiating rule unavailable, after a selecting of a terminating rule for another system call of the series; wherein the processor 620 runs the processes of assigning a priority and selectively enabling transmission only for the system call for which the terminating rule is selected.

According to an embodiment of the invention, processor 620 may be configured to implement the modifying of the rule selection scheme by running in the kernel mode a process of modifying the group of rules that is stored in the kernel memory, wherein any modifying of the group of rules following a selection of a rule does not modify a storage size of the group of rules in the kernel memory.

According to an embodiment of the invention, processor 620 may be further configured to run in the kernel mode a process of determining for each system call made to any kernel entity of the kernel whether to carry out for that system call the stages of selecting, assigning, and selectively enabling, wherein the determining is responsive to a type of the system call.

According to an embodiment of the invention, processor 620 may be further configured to run in the kernel mode a process of making information regarding the system call and the priority assigned to it available to a user mode module that operates outside the kernel.

According to an embodiment of the invention, processor 620 may be further configured to run in the kernel mode a process of preventing transmission of the system call that is issued by a process otherwise privileged by the kernel by access to the destination during the selectively enabling of transmission of the system call.

According to an embodiment of the invention, processor 620 may be further configured to run in the kernel mode prior to the selecting of the rule the processes of: (a) retrieving rules data by the dedicated driver from a non-volatile memory 640 of the computer 600 (it is noted that nonvolatile memory 640 is not the kernel memory and does not include the kernel memory); (b) processing the rules data to provide a different representation of the group of rules, and (c) writing the different representation of the group of rules to the volatile kernel memory (e.g. in memory 610).

According to an embodiment of the invention, the process of selecting of the rule is responsive to dynamic variables (of the rule) that are determined after the processing of the rules data is complete (such as during runtime). Such dynamic variables may be, for example, path, process name, pattern, etc.

Referring to all the possible implementations noted above (method 500, system 10, computer 600, etc.), it is noted that modifying the group of rules may correspond to an anticipated order of operations (and their corresponding system calls)—whether a proper order or an improper one that should be prevented.

This may be implemented by including in some or all of the rules information that is used to modify other rules—whether by modifying their availability for selection, or by otherwise modifying their content (e.g. by modifying parameters).

It is noted that not all of the rules must participate in this mutual modification of rules. Some of the rules may be simple rule, according to which a priority is assigned, but no modification of this rule or another one is carried out.

Other rules may be correlation rules, which participate in the modification of one another. A correlation is a mechanism, enabling differentiation of normative behavior from malicious one. Using correlation, it is also possible to keep track of the accurate context in which a potentially dangerous kernel function has been initiated by the OS.

The correlation may be constructed from several different rules and events, as described below, such as initial rule (or rules, if more than one series of rules is implemented); a middle rule, a terminating rule, and so forth.

Conveniently, a status (or activity flag) of an Initial Rule is active once the dedicated driver is started. Each initiating rule starts a correlation (also referred to as a series), and change the status of some or all of the rules of the correlation to active once it matches an event (i.e. once it is selected in response to a system call). This means that additional objects (e.g. in-middle rules, etc.), within the correlation, will become active.

It is noted that several types of intermediate (or middle) rules may be implemented—such as simple middle rules (which should be carried out in order), negative rules (also referred to as NOT rules) that should not be carried out at all during the series—or at least during a portion of it, and independent rules that should be selected and executed during the correlation, but not necessarily in any particular order.

Once the Initial rule is selected by the dedicated driver, the following rules should change their status, such as (for example):

Next Simple Middle rule's status will be changed to Active, according to the correlation rule order.

All NOT Independent rules' status will be changed to Active.

All Independent rules' status will be changed to Active.

A simple Middle Rule in correlation is a simple rule that becomes active once the previous middle rule was matched with an event (i.e. selected for a system call), according to the correlation. See a sample:

Once the Simple Middle rule finds a match—the correlation will continue to the next rule. In case that the next rules are NOT (!) Rules, then the status of the next NOT (!) Rules and the next Simple In-Middle Rule will be changed to Active. Once the Simple Rule will find a match, the status of the NOT (!) Rule will be changed to Inactive. The correlation will continue to the next simple rule/NOT (!) Rule.

As for a Not Rule in correlation, if a system call result in the selection of this rule, the correlation is reset. In some embodiments of the invention, this rule means that if the matched event occurs, then it is an indication that a normal behavior is in action and the correlation can be reset (canceled). This event is active once the previous event finds a match, according to the order of the correlation. When the correlation is reset, the initial rule of the correlation would generally be made active, and all Correlations' Active rules' status will be changed to Inactive.

As for an Independent Rule in correlation, this event can occurs anytime between the initial rule to the Exit rule with no specific order, and is active once the initial event finds a match. Once the Independent event finds a match—the rule will be marked as Inactive and it is marked that this independent rule was matched.

Another type of rule that may be implemented is negative (or NOT) Independent Rule in correlation. According to an embodiment of the invention, this event reset the correlation when it is matched. These rules may mean, in some embodiments of the invention, that if this event was matched then it is an indication that a normal behavior is in action and the correlation can be reset (canceled)

Each correlation also has a terminating rule (also referred to as Exit Rule).

This event which is matched to the Exit rule is the major target of the correlation—once this rule is matched with an event, the correlation reached its end, and the pre-defined priority will be assigned to it. It will usually be a high risk or prevention priority.

According to an embodiment of the invention, such as rule is active once all events marked as inactive after matched:

All Simple Middle Rules' status were change to Inactive;

All Independent Rules' status marked as inactive after matched;

None of the NOT events occurred.

Once the Exit rule finds a match—the rule will get the priority that was set in the initial event and will send alerts to the server.

According to an embodiment of the invention, the exit rule will stay Active until a NOT (!) Independent event occurred. Once a NOT independent event occurred and matched, the correlation will be reset.

According to an embodiment of the invention, a tangible non-transient computer readable medium is disclosed, the tangible non-transient computer readable medium having a computer readable code embodied therein for processing system calls in a computerized system that implements a kernel, the computer readable code including instructions for a dedicated driver operating in kernel mode, wherein the instructions include: (a) selecting a rule out of a group of rules that is stored in a kernel memory of the computerized system, in response to system call information that pertains to a system call made to a kernel entity of the kernel; (b) assigning a priority to the system call in response to the rule selected; and (c) selectively enabling transmission of the system call to its destination, in response to the priority assigned to the system call.

It is noted that the computer readable code may further include instructions for some or all of the stages of method 500 disclosed above.

Figure 4:
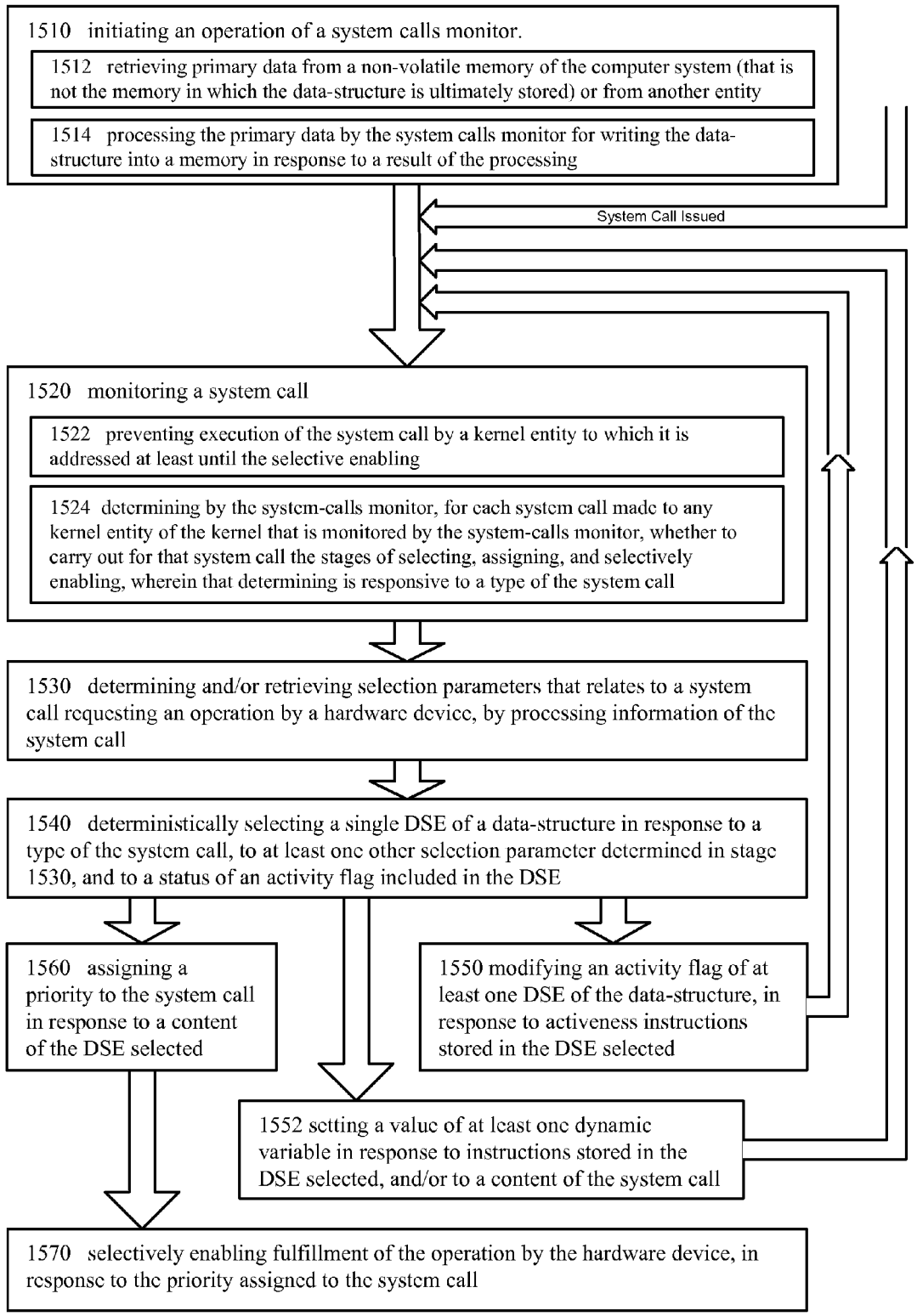
FIG. 4 illustrates a system for processing system calls in a computerized system that implements a kernel, according to an embodiment of the invention.

FIG. 4 illustrates system 1500 for processing system calls in a computerized system that implements a kernel, according to an embodiment of the invention. Referring to the examples set forth in the additional drawings, method 1500 may be implemented by computer 1600, and especially by processor 1620.

It should be noted that the term "computerized system" is not limited to software solutions or to hardware ones, and may be used to refer to any out of a variety that extends both to hardware and to the operating system and other software used. For example, various computerized systems in which kernel may be implemented are personal computers, servers, cellular telephones and other portable computerized systems, production machinery computers/networks, Microsoft Windows based systems, Linux based system, Android based systems, and so forth.

Method 1500 may start with stage 1510 of initiating an operation of a system calls monitor. It is noted that the system calls monitor may be implemented in software, in hardware, in firmware, or in any combination thereof. For example, the system calls monitor may be implemented as a dedicated driver operating in kernel mode, which is run by a processor (e.g. CPU) of a computer in which the system calls are issued. According to an embodiment of the invention, the system calls monitor may be built in into the computerized system in which the monitoring of system calls is implemented.

As discussed below, such a system calls monitor uses a dedicated data-structure out of which it retrieves information that is necessary for the selective enabling of operations requested in the system calls. While in some embodiments of the invention, this data-structure may be stored in a memory of the system-calls monitor or in a dedicated memory exclusive to the system calls monitor, in other embodiments the data-structure may be stored in a shared memory (e.g. in a portion of the memory privileged to the system-calls monitor, in a memory portion dedicated to kernel operations, or in general access memory). Such a memory may be a volatile memory or a non-volatile memory.

According to an embodiment of the invention, the system-calls monitor itself may write the data-structure to the memory, and/or update it in the memory from time to time.

According to an embodiment of the invention, method 1500 may include stage 1512 of retrieving primary data from a non-volatile memory of the computer system (that is not the memory in which the data-structure is ultimately stored) or from another entity (e.g. via network connection). Stage 1510 may be carried out by the system-calls monitor, such as by the dedicated driver operating in kernel mode.

Stage 1512 may include retrieving (or loading) a behavior patterns map (BPM) file that defines an analysis of all behaviors managed by the system-calls monitor. It is noted that in some implementations the information retrieved in stage 1512 may be encrypted, modulated, encoded etc, wherein method 1500 may include decrypting and/or demodulating and/or decoding and/or parsing, etc. of the retrieved information.

Method 1500 may further include stage 1514 of processing the primary data by the system-calls monitor for writing the data-structure (and especially its content) into a memory (which may be kernel memory) in response to a result of the processing. It is noted that in other embodiments the data-structure may be written to the memory by another entity. According to an embodiment of the invention, the kernel memory to which the data-structure is written is unavailable to user mode applications.

As is discussed in more details below, the data-structure may be implemented in various ways. For example, the data structure may be implemented as a multi-dimensional array, as a multi-dimensional array incorporating linked-lists, and so forth. Once the data-structure is written to the memory, it should generally be accessible only to the system-calls monitor, and may only be modified by the system-calls monitor.

Modifications are made to the data-structure by the system-calls monitor in order to keep track with the behavior patterns of system-calls made to the kernel in the computerized system—and especially patterns of system-calls made to the kernel by individual user-mode applications that issue system-calls. The modifications made to the data-structure assist in determining whether such behavior pattern correspond to routine behavior of system calls issuing by a user-mode application (or to other allowed behavior pattern), or alternatively does it correspond to a malicious pattern, to other pattern that may harm the computerized system (or other system connected to it), or to any other undesirable pattern that should be prevented. It is noted that additional types of patterns may also be covered—such as intermediary patterns that are not considered dangerous enough for preventing a system call from being executed, but which still should be noted and some actions or notes be taken.

The data-structure includes multiple data-structure elements (e.g. cells, in an implementation of a multi-dimensional array), wherein each of the data-structure elements (DSEs) contain information regarding to the priority that should be assigned to a system call (and potentially other information as well). For each system call that the system-calls monitor handles, a single DSE of the data-structure is selected, and a priority is assigned to the system-call according to information included in the DSE selected.

Apart from information useful for assignment of priority to system-calls, at least some of the DSEs of the data-structure include information that is used by the system-calls monitor to modify the scheme according to which DSEs are selected for system-calls, e.g. as demonstrated below.

Upon arrival of a system call (be it any system call, or system call that qualifies for some criteria, depending on the embodiment of the invention), a routine that starts with stage 1530 is initiated. According to an embodiment of the invention, the system call may be hooked. Stages equivalent to stages In order to facilitate the selective enabling of fulfillment of the operation requested in the system call (which may include prevention of transmission of the system call), method 1500 may include stage 1520 of monitoring a system call (and potentially all of the system calls made to the kernel, or at least all the system calls that qualify for one or more conditions). It is noted that the monitoring of the system call may include hooking and/or intercepting of the system call. According to an embodiment of the invention, the monitoring may be implemented by filter manager or by Network Driver Interface Specification (NDIS).

Method 1500 may also include stage 1522 of preventing execution of the system call by a kernel entity to which it is addressed prior (i.e. at least until) the selective enabling (of stage 1570). According to an embodiment of the invention, stage 1522 may include not only the preventing of the execution of the system call, but also the preventing of transmission of the system call to the kernel entity to which it is issued, prior to the selective enabling (of stage 1570). It is noted that, in order to enable such a real-time operation (in which the transmission of valid system calls may only be delayed for very short period of time), the stages following stage 1522 should be carried out fast. Implementations that were found by the inventors to enable such fast processing of systems calls by the dedicated driver operating in the kernel mode are discussed below, especially in relation to the disclosed data-structures. It should further be noted that stage 1520 and 1522 may be initiated before the selecting of a particular DSE.

According to an embodiment of the invention, method 1500 may include stage 1524 of determining by the system-calls monitor, for each system call made to any kernel entity of the kernel that is monitored by the system-calls monitor, whether to carry out for that system call the stages of selecting, assigning, and selectively enabling, wherein that determining is responsive to a type of the system call.

The determining of stage 1524 may follow the monitoring of stage 1520, if implemented, but this is not necessarily so. It is noted that if a result of the determining of stage 1524 is that negative, stage 1570 may be carried out for enabling transmission of the system call to its destination, in response to the priority assigned to the system call (especially if means for temporary prevention of such transmission were taken, such as in stage 1522).

In other embodiments, stage 1524 may precede 1520 (if implemented), so that only the functions that are relevant (e.g. that pertain to file system, process management, registry, networking, etc.) are hooked in stage 1520.

Stage 1530 includes determining and/or retrieving selection parameters that relates to a system call requesting an operation by a hardware device, by processing information of the system call. It is noted that usually each system call includes various parameters (e.g. source of the system call, type of the system call, target of the system call, operation parameters, and/or payload), wherein stage 1520 may include selecting some of those parameters and/or processing other to provide selection parameters that are not directly included in the system call (by way of example, a size of the payload may be categorized into one of few categories). According to an embodiment of the invention, additional selection parameters that may be used for the selecting of a DSE for this system call may also be determined and/or retrieved—e.g. selection parameters that pertain to a condition of the computerized system, selection parameters that pertain to a condition of the target hardware device, and so forth.

It is noted that some of the selection parameters determined and/or retrieved in stage 1530 may be dynamic variables, whose value results from the implementation of another rule. For example, the content of a request of a first system call may be used for determining the value of one or more dynamic variable, which is later used to determine the value of one or more parameters of the parameters set of another rule.

It should be noted that in some embodiments of the invention, the dynamic variables may be used to directly modify the parameter sets of other one or more DSEs. However, in other embodiments, the dynamic variables are stored separately from the rules DSE (either in the same data structure, or in a separate one or more data-structure), and their value is being checked in that separate location whenever they are needed (e.g. as exemplified in FIG. 5C).

Following the determining (and/or retrieving) of the selection parameters (those that relate to the system call and those that do not relate to it—if any), method 1500 continues with stage 1540 of deterministically selecting a single data-structure element (DSE) of a data-structure in response to a type of the system call, to at least one other selection parameter determined in stage 1530, and to a status of an activity flag included in the DSE that indicates an availability of the DSE for selection. It is noted that the selecting may be responsive to the statuses of the activities flag of at least one other DSE, apart from the DSE selected.

In the data-structure, some or all of the DSEs include an activity flag (or otherwise have an activity status associated with them) that indicates whether the respective DSE is available for selection (and especially for selection by the system-calls monitor in stage 1540). Those activity flags (which may be binary flags—e.g. implemented as an activity bit flag, and may also have more than two states) may usually be set during the first writing of the data-structure, but at least some of them are also modified at least once— usually (and possibly only) in response to the content of another DSE that was selected in an iteration of stage 1540.

The content of each of the DSEs includes information useful for the determining of the priority to be assigned to the system call for which this DSE may be selected (e.g. the priority itself, but not necessarily so), and may also include information relating to the modification of a state of the activity flag in at least one DSE of the data-structure.

Such modification may pertain to the activity status (which in turn pertains to the availability for selection) of that very same DSE and/or at least one other DSE. It is noted that in some embodiments of the invention, that information may include deterministic independent instructions relating to the modification of the state of the activity flag in the at least one DSE of the data-structure, while in other embodiments that information may include instructions for the modification of the state of the at least one activity flag in response to additional factors (e.g. state of the computerized system, parameters of the system call, etc.).

It is noted that the selecting of the DSE (or at least one DSE, if multiple DSEs are selected in multiple iterations of stage 1540 for different system calls) includes selecting a DSE that includes an activity flag that indicates that the DSE is available for selection (hereinafter such a DSE is also referred to as "available DSE"); wherein at least one DSE of the data-structure is an DSE that includes an activity flag indicating that the inactive DSE is not available for selection (hereinafter such a DSE is also referred to as "inactive DSE");.

It is noted that in some embodiments of the invention (and at least in some situations), the selecting of the available DSE may be preceded by multiple instances of considering selection of another DSE of the data-structure in response to the type of the system call, and to at least one other selection parameter determined in stage 1530, and determining not to select this other DSE because it includes an activity flag that indicates that this other DSE is not available for selection (i.e. it is an "inactive DSE"). It is noted that multiple inactive DSEs may be consecutively considered for selection, until reaching an available DSE. Usually, once considering a DSE for selection and discovering it is an available DSE, this available DSE is the DSE that is selected in stage 1540.

By way of example, multiple DSE may be included in a linked list (which is a sub-data-structure of the data-structure). The selecting according to such an embodiment of the invention may include deterministically selecting a linked list in response to the type of the system call, and to at least one other selection parameter determined in stage 1530. Once the linked list is selected, DSEs of the linked list are considered for selection according to an order of the linked list, and once reaching a DSE that is an available DSE, this available DSE is the DSE that is selected in stage 1540. It is noted that other sub data-structures in which the DSEs included are unequivocally ordered may also be implemented.

It is noted that deterministically selecting pertains to selection in which a result of the selection does not depend on random factors, but rather depends on the parameters used for selection, and on a state of the data-structure out of which a DSE (or a linked list or another ordered sub structure) is selected.

According to an embodiment of the invention, the selecting of the DSE includes selecting it by reiteration over a linked list. Method 1500 may therefore include reiterating the stage of selecting if the DSE selected is inactive, until selecting a DSE that is available for selection, wherein the reiterating includes selecting a next DSE in response to a pointer in a currently selected DSE.

After a DSE is selected, its content is processed and at least one action is carried out according to its content.

Stage 1540 may be followed by stage 1550 of modifying an activity flag of at least one DSE of the data-structure, in response to activeness instructions stored in the DSE selected. The modifying may usually include modifying a state of the activity flag—e.g. from available for selection to unavailable, and vice versa.

By modifying the activity flag of the at least one DSE of the data-structure, the deterministic selection scheme used for future system calls is modified. In most cases, such a modification would not affect any possible future system call, but only system calls for which a possible-matching DSE was modified (by modifying its activity flag). Therefore, if a given system call may have resulted in a selection of data-structure element A before the modification, another data-structure element B may be deterministically selected for it because of the modification.

According to some embodiments of the invention, it is therefore possible to consider the data-structure as a state-machine, in which the DSE selected for each call depends on a state of the data-structure that is reflected at least, in the state of the activity flags of all of the DSEs of the data structure.

It is noted that identical (or practically identical) system calls—for which identical selection parameters are determined or retrieved in stage 1530—may result in a selection of different DSE if the data-structure is in a different state. However, according to an embodiment of the invention in which the state of the data structure that is equivocally definable by the state of the activity flags of all of the DSEs of the data structure, such identical system call will always result in the selection of the same DSE.

That is, in some embodiments of the invention, the processing that is included in stage 1530 of determining includes processing information of a first system call made to a requested entity in the kernel (e.g. to a driver that manages the hardware device, wherein in another instance of stage 1530 (for a second system call), method 1500 further includes processing information of the second system call made to the requested entity wherein the processing results in providing selection parameters that are identical to the selection parameters provided for the first system call.

In such embodiments of the invention, the stages of selecting, modifying, assigning a priority, and selectively enabling fulfillment (some of which are discussed above while others are discussed in more details below) are carried out for the second system call as well; wherein the stage of selecting, when carried out for the second system call, results in deterministically selecting another DSE of the data-structure (i.e. a DSE other than the one selected for the first system call) in response to a same type of system call and to the same at least one other selection parameter used for the first system call.

It should be noted that in some embodiments of the invention, the availability for selection for some of the DSEs of the data-structure is not changed during operation—and those DSEs are always in "active" or "available" mode. Such DSEs may conveniently include instructions or rules that apply in all times. It is further noted that albeit not having their availability modified—in some embodiments of the invention such DSEs whose availability is not modified during operation may include instructions for the modification of the availability of other DSEs in the data-structure.

Modification of the deterministic selection scheme by modifying the activity flag of one or more DSEs may allow handling of series of operations that are taking place in the computerized systems—wherein system calls may be prevented or authorized as part of a series, and not only independently of other system calls issued previously. Modifying the activity flag in one or more DSEs may correspond to an anticipated order of operations (and their corresponding system calls)—whether a proper order or an improper one that should be prevented.

According to an embodiment of the invention, the modifying of the activity flag of the at least one DSE in stage 1550 is responsive to a permissibility of a sequence of operations to which the requested operation belong. For example, if a sequence of operations is deemed proper, the modification of the activity flags of the DSEs reflects that, and if that sequence of operations is deemed improper the modification of the activity flags would reflect that.

As aforementioned, not all of the DSEs must participate in this mutual modification of availability for selection. DSEs that do participate in this modification scheme may be regarded as correlation DSE (and/or as DSE including correlation rules) that participate in the modification of one another. It is however noted that a DSE that is modified in response to the content of another specific DSE does not necessarily include instructions pertaining to the modification of the availability of that specific DSE.

Usually, DSEs that participate in such modification scheme may be divided into groups (which correspond to series of system calls or operations) wherein each of the DSEs includes instruction pertaining to the availability of at least one DSE of the group (be it another DSE of the group and/or itself). According to an embodiment of the invention, those groups of DSE are mutually exclusive groups—wherein the availability for selection of a DSE of a first group may not be modified in response to the content of a DSE that belongs to any other group.

The aforementioned correlation is a mechanism that may be used, inter alia, for differentiation of normative behavior from malicious one. Using correlation, it is also possible to keep track of the accurate context in which a potentially dangerous kernel function has been initiated by the OS.

Such aforementioned group of DSEs—which may be regarded as a correlation group—may be constructed from several DSEs that correspond to various rules, as described below, such as initial rule (or rules, if more than one series of rules is implemented); a middle rule, a terminating rule, and so forth. It is noted that the DSEs of the group may belong to different types of system calls and/or to a single type of system calls. Referring to the linked list implementation discussed above (according to which DSEs of the linked list are considered for selection according to an order of the linked list until reaching an available DSE), some DSEs of the correlation group may belong to the same linked list, but this is not necessarily so.

Conveniently, an Initial Rule DSE is available for selection once the system-calls monitor is initiated. Each initiating rule DSE starts a correlation (also referred to as a series), and may, for example, change the status of some or all of the DSEs of the correlation group to available for selection once it matches an event (i.e. once it is selected in response to a system call). However—in some embodiments, not all of the DSEs of the correlation group are set to available (e.g. if the correlation group includes a sub-group which pertains to a sub-correlation, of which only a secondary initial rule is set for available).

It is noted that intermediate (or middle) rules DSEs may include intermediate rules of several types—such as simple middle rules (which should be carried out in order), negative rules (also referred to as NOT rules) that should not be carried out at all during the series—or at least during a portion of it, and independent rules that should be selected and executed during the correlation, but not necessarily in any particular order.

Once the Initial rule DSE is selected by the system-calls monitor, the availability flags of the following DSEs should be modified, such as (for example):

Next Simple Middle rule's DSE status will be changed to Active, according to the correlation rule order.

All NOT Independent rules DSEs status will be changed to Active.

All Independent rules DSEs status will be changed to Active.

A simple Middle Rule DSE in a correlation group is, according to an embodiment of the invention, a simple rule DSE that becomes active once the previous middle rule DSE was selected for a previous system call, according to the correlation. See a sample:

Once the Simple Middle rule DSE finds a match—the correlation will continue to the next rule. In case that the next rules are NOT (!) Rules, then the status of the next NOT (!) Rules DSEs and the next Simple In-Middle Rule DSE will be changed to Active. Once the Simple Rule DSE will be selected, the status of the NOT (!) Rule DSE will be changed to Inactive. The correlation will continue to the next simple rule/NOT (!) Rule.

As for a Not Rule in correlation, if a system call result in the selection of this rule, the correlation is reset. In some embodiments of the invention, this rule means that if the matched event occurs, then it is an indication that a normal behavior is in action and the correlation can be reset (canceled). This event is active once the previous event finds a match, according to the order of the correlation. When the correlation is reset, the initial rule of the correlation would generally be made active, and all Correlations' Active rules' status will be changed to Inactive.

As for an Independent Rule in correlation, this event can occur anytime between the initial rule to the Exit rule with no specific order, and is active once the initial event finds a match. Once the Independent event finds a match—the rule will be marked as Inactive and it is marked that this independent rule was matched.

Another type of rule that may be implemented is negative (or NOT) Independent Rule in correlation. According to an embodiment of the invention, this event reset the correlation when it is matched. These rules may mean, in some embodiments of the invention, that if this event was matched then it is an indication that a normal behavior is in action and the correlation can be reset (canceled).

Each correlation group may include one or more (and in some embodiments only one) terminating rule DSE (that include instructions referred to as terminating rule or Exit Rule). Once this DSE is selected, the correlation reached its end, and the pre-defined priority will be assigned to the system call for which the Exit rule was selected. It will usually be a high risk or prevention priority.

According to an embodiment of the invention, such a terminating rule DSE is made active once all events marked as inactive after being selected:

All Simple Middle Rule DSEs status were change to Inactive (e.g. after the corresponding middle rules being matched, or—for NOT rules, when the NOT rule was made inactive in response to another in-middle rule);

All Independent Rule DSEs status marked as inactive after selected;

None of the NOT events occurred (i.e. none of the NOT DSEs were selected).

Once the Exit rule DSE is selected—the indication of priority to be assigned to the respective system call may be retrieved from that exit rule DSE (or, in another embodiment of the invention, from the initiation rule that initiates the correlation), and corresponding actions may be carried out.

According to an embodiment of the invention, the exit rule DSE remains active (once its status is modified to available for selection) until a NOT (!) Independent event occurred. Once a NOT independent or simple NOT (!) event occurred (i.e. respective system call issued) the corresponding NOT DSE is selected, and the correlation is reset. That is, in some embodiments of the invention, the exit rule—if matched (the corresponding DSE being selected), does not end the correlation. For example, if the matching of the exit rule results in the action of preventing the execution of the respective system call, it may be desired that similar system calls—if repeated—would also be prevented. Therefore, such a correlation does not end with the matching of its exit rule. Such a correlation would conveniently end when one of its NOT rule will be matched (corresponding NOT rule DSE selected). It is noted that other rules, external to the correlation, may also result in ending of such correlation (and rendering its exit rule DSE unavailable for selection), wherein those rules may be regular rules and/or NOT rules.

Generally speaking, according to an embodiment of the invention, the activeness instructions included in the DSEs are, according to an embodiment of the invention, deterministic activeness instructions that depend only on the content of the DSE, and not on external conditions (e.g. not on a state of the computerized system).

In some embodiments, the at least one DSE of which the activity flag is modified may be the selected DSE and/or at least one other DSE. In other embodiments, restrictions to the identity of the DSE may apply (e.g. according to an embodiment of the invention, a DSE may be prevented from including instructions for the modification of its own activity flag).

In embodiments of the invention in which dynamic variables are implemented, method 1500 may further include stage 1552 of setting a value of at least one dynamic variable. In various embodiments of the invention, the setting of the value of the at least one dynamic variable may be carried out in response to instructions stored in the DSE selected, and/or to a content of the system call.

It is noted that the number and names of the dynamic variable is not necessarily fixed, and in some embodiments of the invention may be dynamic, and stored in a correspondingly dynamic data-structure such as a linked list. An example of such a data-structure is exemplified in FIG. 5C Stage 1540 is also followed by stage 1560 of assigning a priority to the system call in response to a content of the DSE selected. That is, the selected DSE includes information indicative of the priority to be assign to the system call for which it is selected, and after retrieving this information from the selected DSE, the systems-calls monitor may assign a priority to the system call in response to this information.

It is noted that, according to an embodiment of the invention, stage 1560 (and possibly also stage 1570) are carried out before stage 1550—because the bottleneck may lay in the selective enablement of the system call—and therefore it may be prioritized over the modification of activity flags—which is less reluctant to delays.

Stage 1560 may be followed by stage 1570 of selectively enabling fulfillment of the operation by the hardware device, in response to the priority assigned to the system call. It is noted that the selective enabling may be carried out by the system-calls monitor autonomously (e.g. by discarding this system call after monitoring it), and may also be carried out in cooperation with at least one other entity (e.g. another kernel entity).

It is noted that in some embodiments of the invention, the selectively enabling fulfillment may include (or be replaced with) mitigating the system call, by modifying the system call, and so forth.

According to an embodiment of the invention, the selectively enabling fulfillment of the operation includes preventing a fulfillment of an operation that belongs to a malware attack. Such a malware attack may be carried out by various software component—whether in the computerized system or externally to it—such as a computer virus, a Trojan horse software, a worm, a network attack, a multisource network attack, and any combination of the above. It is noted that not necessarily all the operations of the malware attack are prevented—and that the preventing of initial operations (which may be the first operations in a sequence or a series) is not necessarily essential or desirable. The focus of the prevention may be in preventing those operations that cause actual damage to the computerized system.

It is also noted that the selectively enabling fulfillment of the operation may also include preventing a fulfillment of an operation that does not originate in a malware but is otherwise considered harmful or undesirable. For example, such an operation may originate in a poorly written software that contains a harmful bug, and may originate in a legitimate software but would considered harmful in a state in which the computerized system is at.

As one can see, in the entire course of method 1500, the modifications to the data-structure are limited (at least in some embodiments of the invention) to modifying of activity flags in DSEs.

It is noted that according to an embodiment of the invention, during the entire operation of the system-calls monitor (e.g. the dedicated driver operating in kernel mode) after its initiation (e.g. after a first system call is processed according to method 1500), no DSEs are added or removed to the data structure.

According to an embodiment of the invention, during the entire operation of the system-calls monitor the parameters in each DSE that pertain to its selection are not modified.

According to an embodiment of the invention, during the entire operation of the system-calls monitor, no linked-list information included in any of the DSEs (nor any other pointer to other DSEs) is modified.

According to an embodiment of the invention, during the entire operation of the system-calls monitor, the activity instructions included in various DSEs is not modified.

It may therefore be clear that in at least some embodiments of the invention, the size of the data-structure used by the system-calls monitor is not modified during the entire course of operation of the system-calls monitor, after it is initially generated.

Utilizing a fixed-size data-structure means that the complexity of handling system-calls is not increased during the course of operation of the system-calls monitor, and the speed of operation may be kept within acceptable boundaries (if not substantially fixed) during the course of operation.

According to an embodiment of the invention, the modifying of content in any of the DSEs of the data-structure in response to the content of any DSE of the data structure does not modify a storage size of the data-structure in a memory in which the data structure is stored.

As aforementioned, according to an embodiment of the invention, the stages of processing, selecting, modifying, assigning and selectively enabling are carried out by a dedicated driver operating in kernel mode of a computerized system.

Referring to the groups, series, and correlation groups mentioned above, it is noted that in some embodiments of the invention, stage 1560 of assigning a priority may be carried out only for one system call in such a group, usually the system call that terminates a processing of the group as a group (e.g. an exit rule in a correlation, a terminating rule DSE in a group of DSEs, etc). While in other embodiments, priority may also be assigned to previous system calls in the group, in such embodiments it is noted that the previous system call may not be of importance by themselves, but only as leading to the terminating system call.

According to an embodiment of the invention, the selecting of stage 1540 (in a particular iteration of it) includes selecting the DSE that is made available for selection only after a series of multiple iterations of selecting other DSEs and modifying activity flags in response to the other DSEs; wherein no priorities were assigned in response to the content of any of the other DSEs; wherein the modifying that follows the selection of that DSE in that particular iteration includes modifying the activity flag of the selected DSE to indicate that it is not available for selection. The activity flags of other DSEs of the group may be modified as discussed above.

Figure 5A:
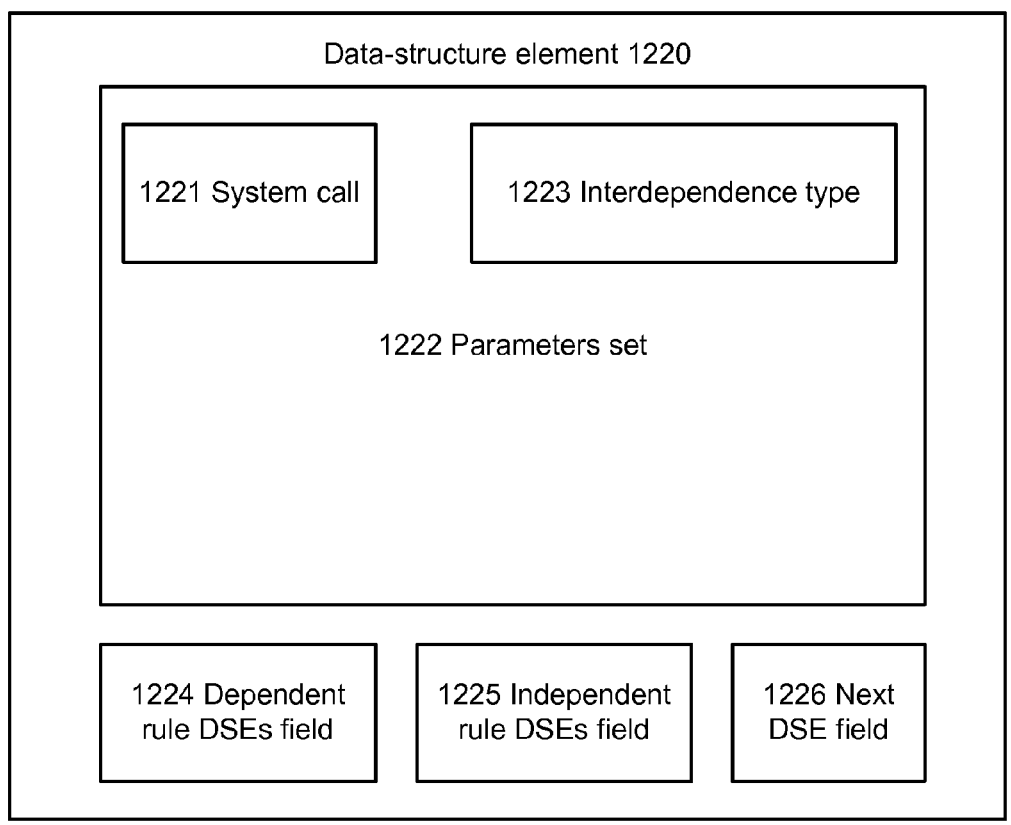
FIGS. 5A and 5B illustrate a data structure according to an embodiment of the invention, as well as data-structure elements that are included in the data-structure, according to an embodiment of the invention.
Figure 5B:
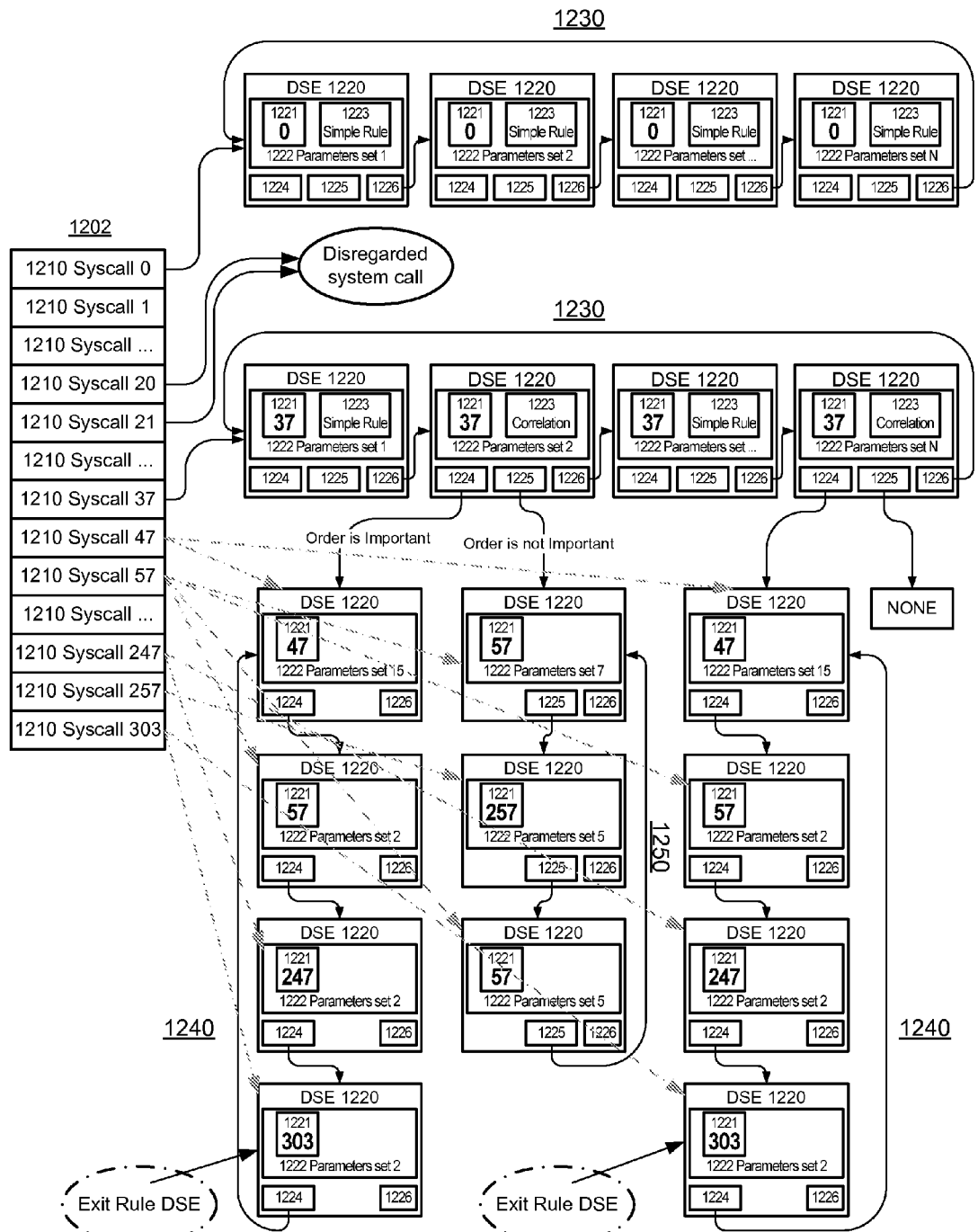

FIGS. 5A and 5B illustrate data structure 1200 according to an embodiment of the invention, as well as data-structure elements 1220 that are included in data-structure 1200, according to an embodiment of the invention. It is noted that data-structure 1200 may be the data-structure that is used in various stages of method 1500.

It is noted that data-structure 1200 may be parsed to the kernel memory as a kernel memory array (for example) using a pre-compiled ANTLR library, or other type of primary data retrieved from a non-volatile memory of the computer system (that is not the kernel memory in which the data-structure is ultimately stored) or from another entity (e.g. via network connection).

Data-structure 1200 may conveniently include references to all the system calls in the computerized system for which rules exist. For example, it may include references to all the Microsoft Windows system calls for which behavior pattern modeling rules are defined.

For example, data-structure 1200 may include a system-call head node 1210 for each type of system call supported. The system-call head node 1210 may include at least one pointer to one or more DSEs 1220 of data-structure 1210, wherein different pointers of a system-call head node 1210 may pertain to different sets of parameters that may be included in system calls of that type, but this is not necessarily so. It is noted that the system-call head nodes are not necessarily part of data-structure 1200.

Some of the system-call head nodes 1210 may include pointers to static elements of the data-structure that indicates that those types of system calls are of no interest, and do not participate in the scheme of priority assignment. For example, the system-call head nodes 1210 denoted "syscall 20" and "syscall 21" are such.

Those system-call head nodes 1210 may be stored in a dedicated table 1202 residing in the kernel memory, which holds pointers to linked lists allocated by the driver. It is noted that table 1202 may be a part of data-structure 1200, but this is not necessarily so.

Included in the data-structure 1200 are multiple data-structure elements (DSEs) 1220. In different embodiments of the invention, the DSEs 1220 may include various fields.

However, while not necessarily so, the various DSEs 1220 of the data-structure may be of the same type, include the same fields of the same size and location. In other embodiments, there are two or more types of DSEs 1220 in the data-structure 1200.

According to an embodiment of the invention, each of the DSEs 1220 include some or all of the following fields:

System-call type-identifier 1221. It is noted that in some embodiments this field is redundant or omitted, as all DSEs 1220 pertaining to the same type of system calls may be organized in a single linked list or other sub-structure of data-structure 1200;

Parameter set 1222, which include system calls parameters to be matched to the selection parameters determined for system calls. The parameter sets 1222 of different DSEs that pertain to the same type of system call may be completely exclude each-other, or partly overlap;

Interdependence type identifier 1223, that includes information indicative of the type of interdependence of this DSE 1220 to other DSEs 1220, and especially—does it include activeness instructions for the modification of activity flags of one or more DSEs 1220. It is noted that this may correspond to whether the rule that is implemented by that DSE 1220 is a simple rule or a correlation rule;

Dependent rule DSEs field 1224, pointing to (or otherwise indicating) a next DSEs 1220 in an ordered-group linked-list 1240, whose activity flag is to be modified so that an order of selection of DSEs within that linked list is important. The DSEs 1220 of linked-list 1240 may correspond to in-middle rules;

Independent rule DSEs field 1225, pointing to (or otherwise indicating) one or more DSEs 1220 in an unordered-group linked-list 1250, whose activity flags are to be modified so an order of selection of those DSEs is not important. The DSEs 1220 of linked-list 1250 may correspond to independent rules;

Next DSE field 1226, pointing to (or otherwise indicating) a next DSEs 1220 in a type-based linked list 1230 of DSEs 1220 that pertain to the same type of system call, but with different parameter sets. It is noted that an order of the DSEs 1220 within the type-based linked-list 1230 may and may not be important, depending on the implementation.

According to an embodiment of the invention, in case the DSE 1220 is a correlative rule DSE, the list node holds a pointer to a linked-list (second dimension which represents a system call chain), where each DSE 1220 of that list represents a rule monitored by the system-calls monitor in the aforesaid context.

Referring to in-middle rules, such rules are rules for which order of their selection and execution is important, and only certain scenario of rules is meaningful for the correlation to reach its exit.

Referring to independent rules, such rules are rules for which order of their selection and execution is not important. According to an embodiment of the invention, in this case, each of the rules needs to occur in order for the correlation reach its exit.

According to an embodiment of the invention, when a correlation is defined, it will be linked to the in middle or independent rules, which has their memory allocation under the relevant syscall id.

Referring now to data-structure 1200, it is noted that the linked-lists illustrated are only exemplary, and more linked-lists may be implemented. It is further noted that while not illustrated, in some embodiments of the invention a hierarchy of correlation groups may be implemented, in which a DSE 1220 that belongs to a first linked list 1240 or 1250 may initiate another correlation (i.e. another linked list).

It is also noted that in the illustration of FIG. 5B, some of the illustrated DSEs 1220 are identical (e.g. DSEs with system call identifier 57, parameter set 2, and in-middle rule). In various implementations, such DSEs may be implemented as a single DSE 1220, or as more than one DSE 1220. In embodiments of the invention in which each DSE 1220 may only belong to one linked list, such DSEs 1220 are implemented as different DSEs 1220, or alternatively the set of rules is as such that two lists that include an identical DSE 1220 can not be active at the same time.

Figure 5C:
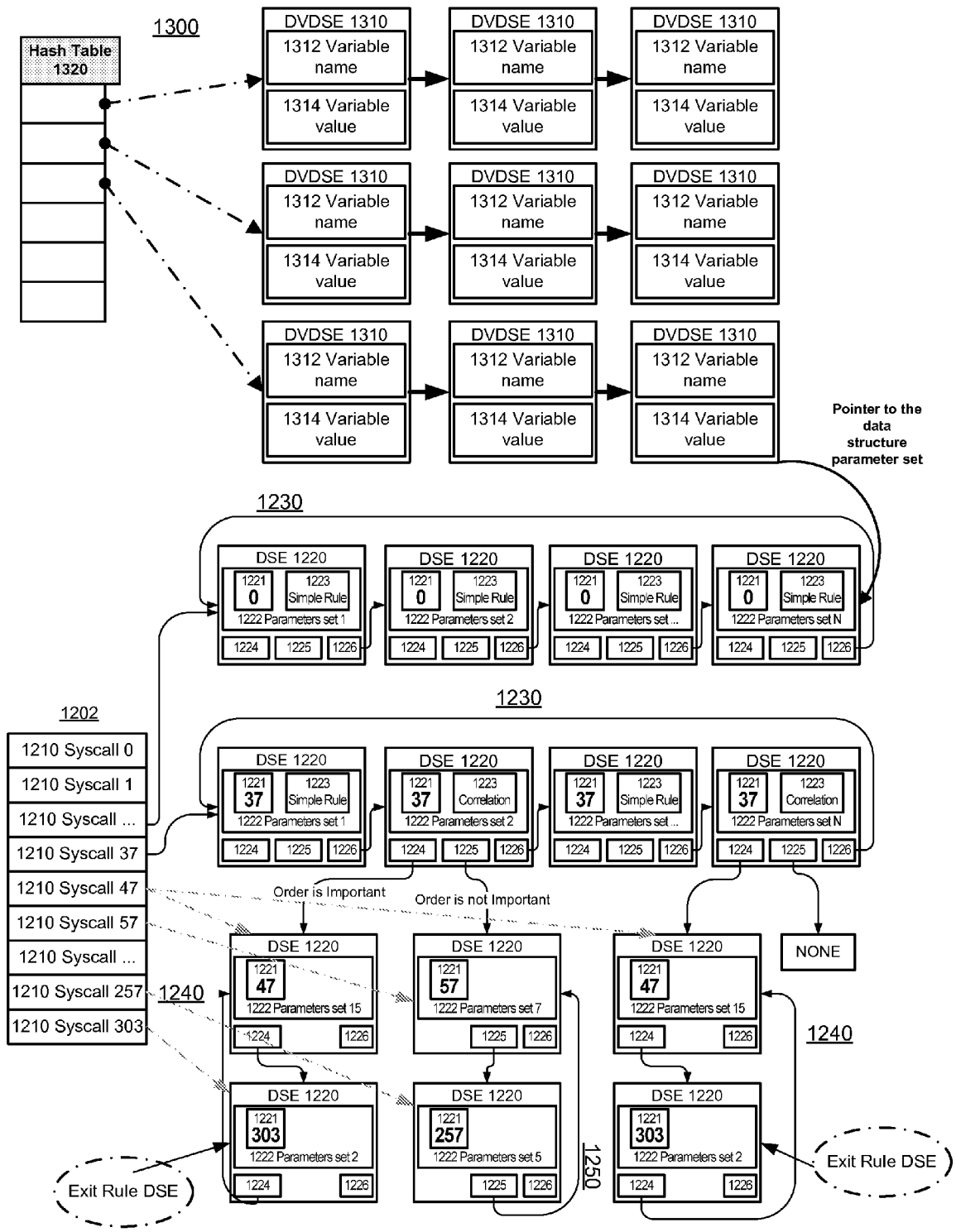
FIG. 5C illustrates a dynamic variables data structure, according to an embodiment of the invention.

FIG. 5C illustrates dynamic variables data-structure 1300, according to an embodiment of the invention, and exemplifies possible relationship with data-structure 1200, according to an embodiment of the invention. according to an embodiment of the invention, data-structure 1300 may be stored in the kernel, but this is not necessarily so. Data-structure 1300 may be generated and/or managed by the dedicated driver operating in the kernel.

Data-structure 1300 includes multiple Dynamic-variables-data-structure elements (denoted DVDSE) 1310, each of which conveniently including a variable name field 1312 storing a name (or other identifier) of the dynamic variable (a named which can be determined, for example, in response to information contained in the rule which instructed its generation), and a variable value field 1314, which either stores the value (or values) of that parameter, or a pointer to another location in which the value (or values) is stored.

According to an embodiment of the invention, the different DVDSEs 1310 are accessed using a hash table 1320 (or equivalent data-structure), wherein each DVDSE 1310 may also include a link to another DVDSE 1310 that matches the same hash value.

According to an embodiment of the invention, some or all of the DVDSEs 1300 may include pointers to one or more DSEs 1220 of data-structure 1200 which use the data stored in the DVDSE 1310 and/or to one or more DSEs that modified or generated its content.

According to an embodiment of the invention, DSEs 1220 of data-structure 1200 may also include pointers to one or more DVDSEs 1310 of data-structure 1300.

A dynamic variable may be part of the parameter set 1222 of a DSE 1220 in data-structure 1200, which receives its value during runtime of the dedicated driver (or equivalent entity). The dynamic variables may usually be initially introduced in the parameter sets as defined in the rules data (e.g. in the part relating to system call initiator (caller), in the part relating to the recipient of the system call (callee), and/or in parts relating to other parameters of the system call) used by the Simple Rule or any of the rules (e.g. in a correlation/series). Following, an instantiation of the dynamic variable may occur during runtime, during its first match.

According to an embodiment of the invention, the dynamic variables, once interpreted and instantiated, are inserted into a hash table data structure (e.g. hash table 1320). According to an embodiment of the invention, the number of variables and variables' values held in the aforesaid hash table may be limited and defined by a constant number, e.g. in order to limit a size of data-structure 1300.

According to an embodiment of the invention, the in-memory representation of the hash table 1300 may include pointers to variable names (stored in the rule table) and their values set after a successful rule match. According to an embodiment of the invention, the memory for variable values is dynamically allocated in run-time.

Figure 6:
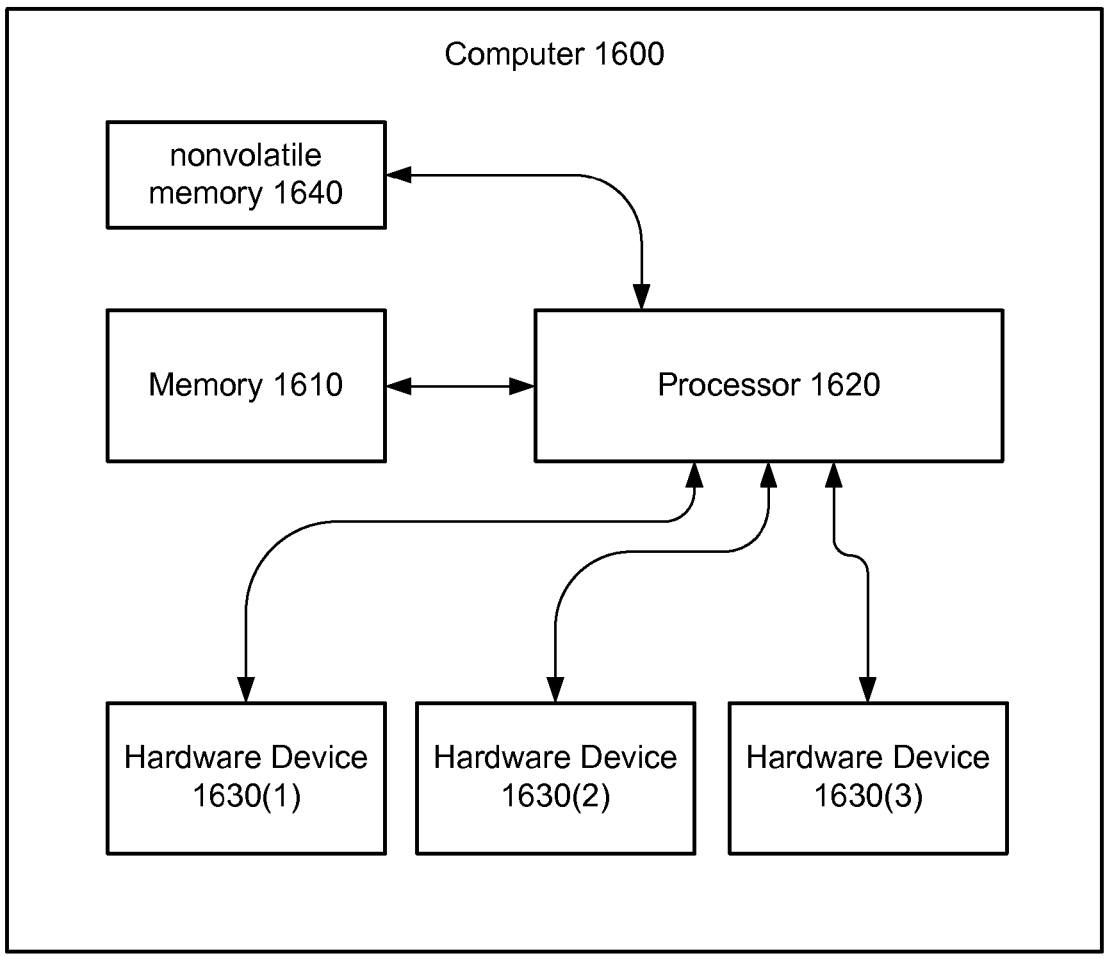
FIG. 6 illustrates a method for instantiation of dynamic variables, according to an embodiment of the invention.

FIG. 6 illustrates method 1700 for instantiation of dynamic variables, according to an embodiment of the invention. method 1700 may be incorporated (or carried out in a parallel manner) to method 1500, but this is not necessarily so. Referring to the examples set forth in the previous drawings, method 1700 may be carried out by computer 1600, and especially by processor 1620.

Method 1700 starts with stage 1710 of monitoring a system call (which may be a part of stage 1520 of method 1500).

Stage 1710 may be followed by stage 1720 of determining and/or retrieving selection parameters that relates to a system call requesting an operation by a hardware device, by processing information of the system call (which may be a part of stage 1530).

Stage 1720 may be followed by stage 1730 of deterministically selecting/matching a rule in response to a type of the system call, to at least one other selection parameter determined, and to availability for selection of one or more rules. This may be implemented, for example, by deterministically selecting a single DSE of a data-structure in response to a type of the system call, to at least one other selection parameter determined in stage 1530, and to a status of an activity flag included in the DSE. Stage 1730 may be a part of stage 1540.

Stage 1730 may be followed by stage 1740 of 1740 setting a value of at least one dynamic variable in response to instructions stored in the rule matched (e.g. DSE selected), and/or to a content of the system call. Stage 1740 may be a part of stage 1552. It is noted that the setting stage may include determining, in response to information included in the rule.

Stage 1740 may be followed by stage 1750 of saving the value of the at least one dynamic variable to a dynamic-variables data-structure (e.g. to a hash table)—either directly to the dynamic-variables data-structure, or by saving a pointer in the dynamic-variables data-structure to another location wherein saving that value. According to an embodiment of the invention, the saving of the dynamic variable in the dynamic-variables data-structure is by generating (or modifying) a dynamic-variables data-structure element, such as dynamic-variables data-structure element 1310 of FIG. 5C.

The stages of 1710-1750 may be iterated for multiple system calls and/or for multiple dynamic variables.

Method 1700 may be followed by (or alternatively include) stage 1810 of reading the value of the at least one dynamic variable from the dynamic-variables data-structure. The reading of the value of the dynamic variable may be during a selecting of a rule (e.g. by selecting a DSE of a respective data-structure), e.g. in (or prior to) stage 1540 of another iteration (for another system call).

Figure 7:
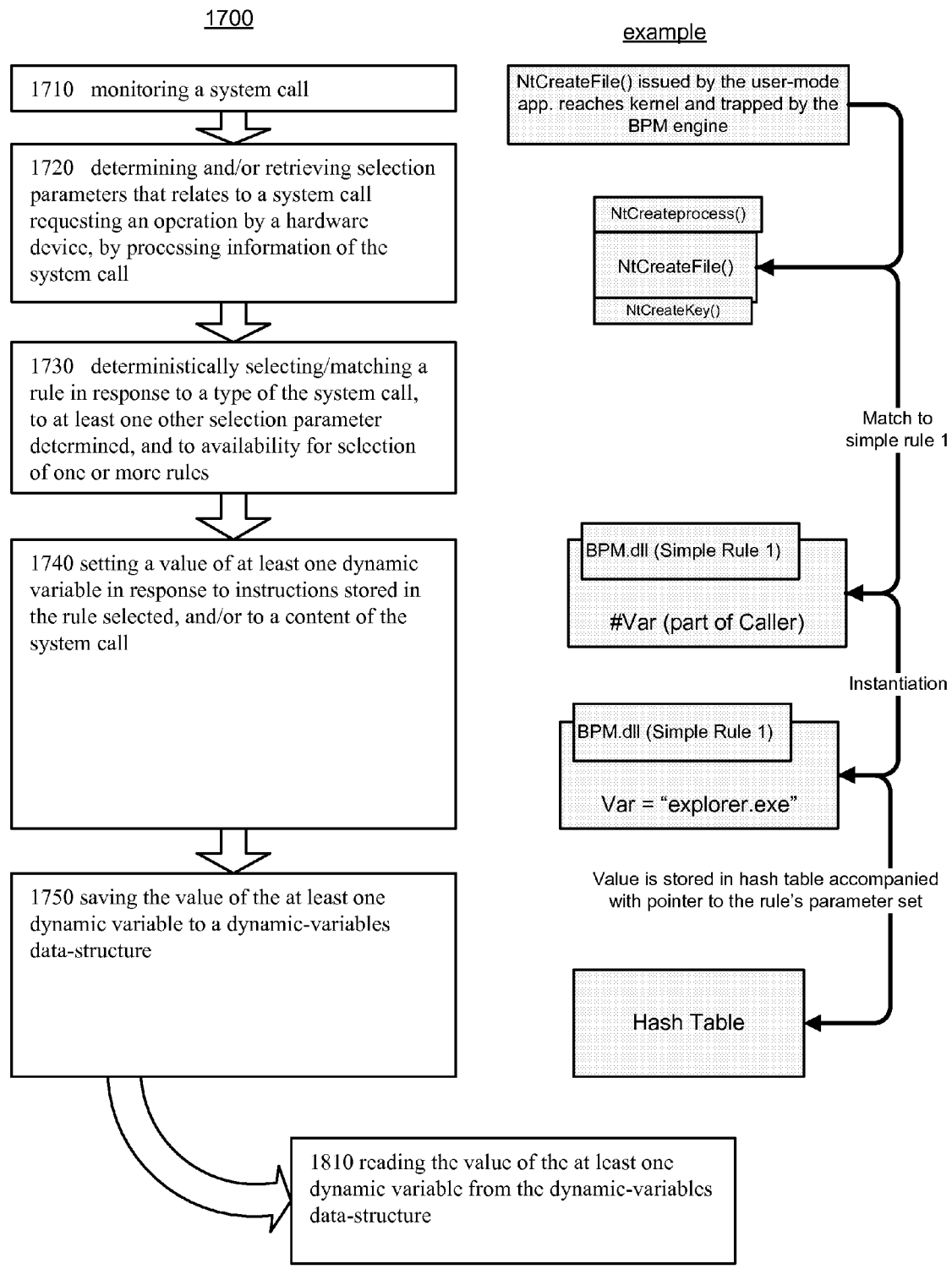
FIG. 7 illustrates a computer, according to an embodiment of the invention.

FIG. 7 illustrates computer 1600, according to an embodiment of the invention. It is noted that computer 1600 may be the computerized system referred to in the description of method 1500, but this is not necessarily so. It is also noted that computer 1600 (and especially a processor of it, and especially a processor of it that runs a dedicated driver in kernel mode) may implement method 1500, or at least parts of it, mutatis mutandis. It is noted that computer 1600 implements a kernel. Generally, processes in the kernel are not directly accessibly to user-mode processes other than by the way of system calls.

Computer 1600 includes at least processor 1620, and memory 1610, and possibly also one or more hardware device 1630 to which the system calls pertain. It is noted that computer 1600 may have more than one processor 1620 (wherein one or more of the processor may implement the some or all of the features of processor 1620 disclosed below) and/or a processor with multiple cores. According to an embodiment of the invention, computer 1600 may have more than a single memory 1610 (e.g. multiple memory chips or modules). It is also noted that memory 1610 may be a non-volatile memory, but this is not necessarily so.

Processor 1620 is configured to run processes in kernel mode and to run other processes not in kernel mode. It is noted that processor 1620 may have a hardware implementation of "kernel mode" (such as the Motorola 168000 that has two processor modes "built into" the CPU, wherein a flag in a status register tells the CPU if it is currently executing in user-mode or supervisor-mode), but this is not necessarily so. For example, according to an embodiment of the invention, the privilege level of the code segment that is currently executed by processor 1620 determines the privilege level of the program executed by processor 1620 and whether it is in kernel mode or not. Apart from kernel mode there may be one or more other modes or "rings".

Processor 1620 is configured to run in the kernel mode at least the following processes: (a) determining selection parameters that relates to a system call requesting an operation by a hardware device, by processing information of the system call; (b) deterministically selecting a single data-structure element (DSE) of a data-structure in response to a type of the system call, to at least one other determined selection parameter, and to a status of an activity flag included in the DSE that indicates an availability of the DSE for selection; wherein the selecting includes selecting a DSE that includes an activity flag that indicates that the DSE is available for selection; wherein at least one DSE of the data-structure is an inactive DSE that includes an activity flag indicating that the inactive DSE is not available for selection; (c) modifying an activity flag of at least one DSE of the data-structure, in response to activeness instructions stored in the DSE selected; (d) assigning a priority to the system call in response to a content of the DSE selected; and (e) selectively enabling fulfillment of the operation by the hardware device, in response to the priority assigned to the system call.

According to an embodiment of the invention, processor 1620 is further configured to selectively preventing a fulfillment of an operation that belongs to a malware attack, in response to the priority assigned to the system call.

According to an embodiment of the invention, processor 1620 is further configured to run in the kernel mode the following processes: processing information of a first system call made to a requested entity to provide selection parameters, processing information of a second system call made to the requested entity to provide selection parameters identical to the selection parameters provided for the first system call; wherein the selecting, modifying, assigning a priority, and selectively enabling fulfillment are carried out for the second system call; wherein the selecting carried out for the second system call results in deterministically selecting another DSE of the data-structure in response to a same type of the system call and to the same at least one other selection parameter used for the first system call.

According to an embodiment of the invention, processor 1620 is configured to repeatedly run the selecting process if the DSE selected is inactive, until selecting a DSE that is available for selection, wherein the reiterating includes selecting a next DSE in response to a pointer in a currently selected DSE.

According to an embodiment of the invention, processor 1620 is further configured to run in the kernel mode a process of selecting the DSE that is made available for selection only after a series of multiple iterations of selecting other DSEs and modifying activity flags in response to the other DSEs; wherein no priorities were assigned in response to the content of any of the other DSEs;

According to an embodiment of the invention, processor 1620 is further configured to run in the kernel mode a process of modifying the activity flag of the selected DSE to indicate that it is not available for selection.

According to an embodiment of the invention, the modifying of content in any of the DSEs of the data-structure in response to the content of any DSE of the data-structure does not modify a storage size of the data-structure in a memory in which the data-structure is stored.

According to an embodiment of the invention, a computer readable medium is disclosed, the computer readable medium is tangibly embodied in a non-transitory storage media, with instruction which, when executed, cause a dedicated driver operating in kernel mode that is run by a processor of a computer that implements a kernel, to: (a) determine selection parameters that relates to a system call requesting an operation by a hardware device, by processing information of the system call; (b) deterministically select a single data-structure element (DSE) of a data-structure in response to a type of the system call, to at least one other determined selection parameter, and to a status of an activity flag included in the DSE that indicates an availability of the DSE for selection; wherein the selecting includes selecting a DSE that includes an activity flag that indicates that the DSE is available for selection; wherein at least one DSE of the data-structure is an inactive DSE that includes an activity flag indicating that the inactive DSE is not available for selection; (c) modify an activity flag of at least one DSE of the data-structure, in response to activeness instructions stored in the DSE selected; (d) assign a priority to the system call in response to a content of the DSE selected; and (e) selectively enable fulfillment of the operation by the hardware device, in response to the priority assigned to the system call.

It is noted that the computer readable code may further include instructions for some or all of the stages of method 1500 disclosed above.

Such a computer readable medium may be, for example, an optical disk, a magnetic hard drive, a solid-state driver, a volatile RAM memory, a FPGA, and so forth. It is noted that other computer readable medium may also be used within the scope of the invention.

Figure 8:
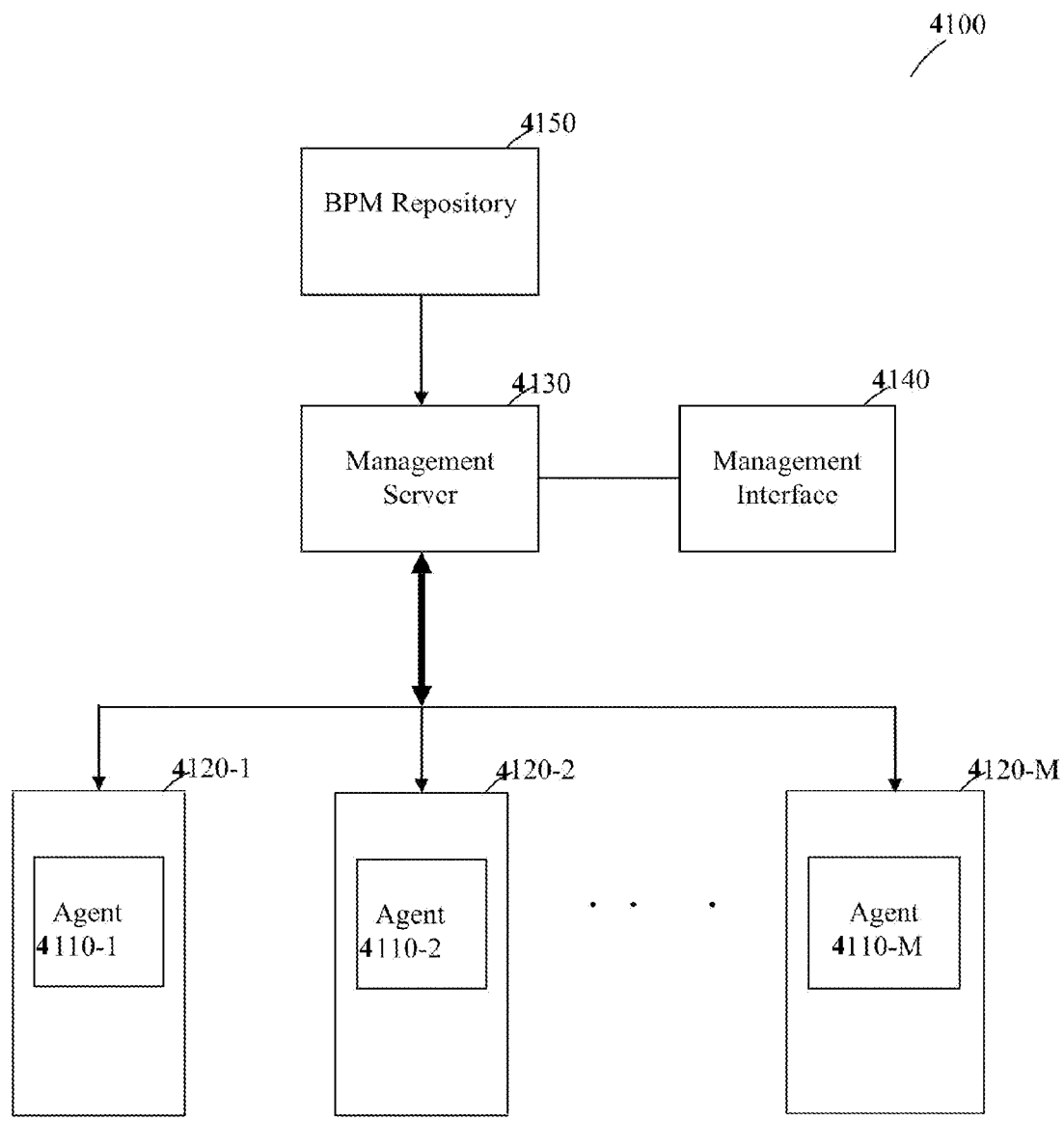
FIG. 8 is a diagram of a security system implemented in accordance with an embodiment of the invention.

FIG. 8 shows a non-limiting and exemplary diagram of a security system 4100 implemented in accordance with an embodiment of the invention. The system 4100 includes a plurality of protection agents 4110-1 through 4110-M, each of which is designed to protect a computer 4120 in which the agent is installed, a management server 4130, a management interface 4140, and a behavior pattern map (BPM) repository 4150 that maintains and distributes updated BPMs to the protection agents 4110-1 through 4110-M (collectively referred hereinafter as a protection agent 4110). Each protection agent 4110 guards a computer 4120 against malicious attacks by detecting attacks committed by a malware program (e.g., a virus, a worm, a Trojan horse, etc.). The attack may be a zero-day attack or a well-known variant of a malware program. As will be described in greater detail below the detection of attacks is based on identifying kernel-space functions that do not match a learnt behavior pattern of such functions. Kernel-space functions are executed in the kernel of an operating system of the computer 4120 for the purpose of controlling and managing the hardware resources of the computer 4120.

The management server 4130 collects and processes events generated by agents 4110 and reports the events to the management interface 4140. The events may include, for example, kernel-space functions that were blocked, functions indentified as harmful, functions identified as not matching the behavior pattern but are not considered as a threat, and so on. In other configurations the system 4100 may include a plurality of management servers, each of which for managing a group of computers belongs, for example, to a business unit in an organization. The management interface 4140 graphically displays the various events and further allows a user (e.g., a system administrator) to control the operation of the protection agents 4110. For example, the user may set the protection agents 4110 to block functions that were identified as not matching the behavior pattern, but are not considered as a threat. More specifically, each function processed by a protection agent 4110 is set with a threat level, and the user may configure the agent 4110 to block functions set with a threat level above a certain level.

Figure 9:
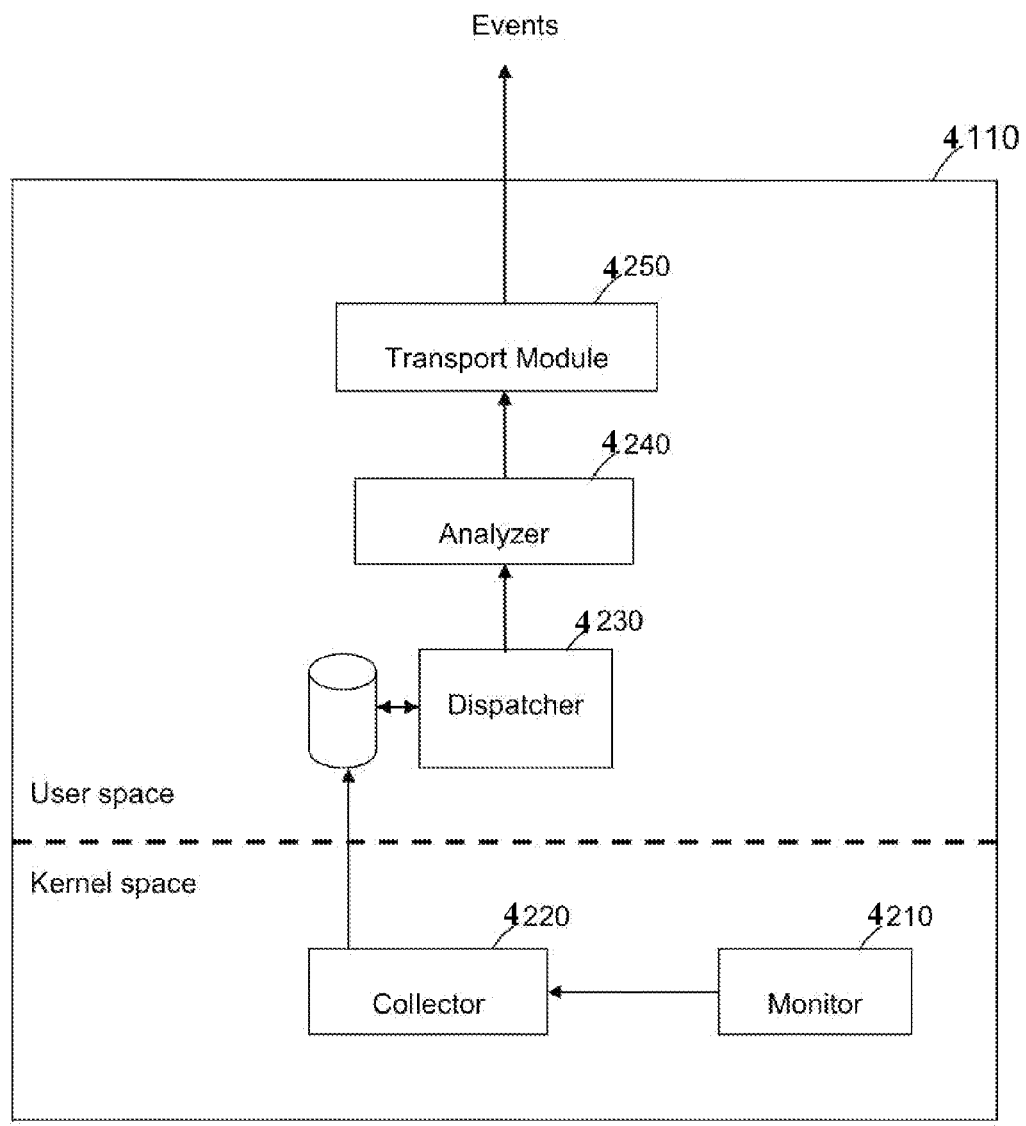
FIG. 9 is a block diagram of a protection agent implemented in accordance with an embodiment of the invention.

FIG. 9 shows a non-limiting and exemplary diagram of the protection agent 4110 implemented in accordance with an embodiment of the invention. The protection agent's 4110 elements are distributed between the user-space and kernel-space of an operating system. The operating system may be, but is not limited to, Linux, Windows XP®, Windows Vista®, and the like. The protection agent 4110 includes a monitor 4210, a collector 4220, a dispatcher 4230, an analyzer 4240, and a transport module 4250. The monitor 4210 intercepts functions received at the kernel space. As mentioned above such functions are utilized to manage the computer's resources and allow other programs to run and use these resources, thus malicious functions can harm the resources of the computer. Generally, the following computing layers (resources) can be affected by malicious functions: services and processes of the operating system, a registry system (i.e., changing, deleting or adding registry keys), a file system (i.e., changing, deleting or adding files), a network connection, and security applications (e.g., a firewall, an anti-virus program, etc.).

Each intercepted kernel-space function is processed and categorized according to a computing layer to which that function is associated with. Thereafter, based on the category that the kernel-space function belongs to and the function's parameter, a unique identification (ID) is assigned. For example, each of the functions "create a new network connection" and "create a new registry key" will be assigned with a different ID.

All functions assigned with their IDs are collected by the collector 4220 which transfers the functions to the dispatcher 4230 being operable in the user space, i.e., memory space where user applications and programs are executed. The dispatcher 4230 controls the rate at which functions received from the collector 4220 will be analyzed by the analyzer 4240.

The analyzer 4240 is the corner stone of the protection agent 4110 and performs all tasks related to indentifying whether a kernel-space function imposes malicious behavior. Specifically, the analyzer 4240 uses a behavior pattern map (BPM) (not shown) and a set of correlation rules to determine the threat level of a function. It should be appreciated that there is a limited set of kernel-space functions and typically such functions perform certain tasks with respect to the computing layers listed above. Furthermore, kernel-space functions follow a certain behavior pattern. The BPM comprises normal behavior patterns of kernel-space functions as well as behavior patterns of threats that do not follow well-known patterns of kernel-space function. A BPM comprises a set of rules, each designating the rule name, a function ID, a rule priority, a behavior pattern, and a caller to the function. For example, the following BPM rule: 047102405, 47, 3, "iexplore.exe", ShellSig, "Internet Explorer is trying to access Windows shell"; ShellSig, "cmd.exe";

In this example, the rule name is 047102405, which refers to a function (event) ID 47 (Process Creation) with a priority 3 when iexplore.exe tries to run cmd.exe. In this rule, the process cmd.exe is represented by ShellSig. The rule is part of an operating system BPM, since it is relevant to the process management.

In accordance with one embodiment of the invention the BPM comprises five different BPMs, each of which is utilized to analyze a set of functions associated with one of the computing layers listed above. That is, an operating system BPM, a registry BPM, a file system BPM, a network BPM, and a security BPM. In this embodiment, each of these BPMs analyzes functions belonging to the same category. For example, kernel-space functions classified as "operating system" will be analyzed by the operating system BPM. The dispatcher 4230 forwards a function to the analyzer 4240 which, based on the function ID, sends the function to the respective BPM. This ensures that multiple kernel-space functions will be processed in parallel and each BPM processes only functions belonging to its category, thereby the operation of the analyzer 4240 and the agent 4110 does not degrade the performance of the computer.

In accordance with an embodiment of the invention, correlation of analyzed functions is performed in order to reduce the number of false alarms and/or in cases when the threat level cannot be determined based on a single function. The correlation is based on a set of rules derived from the normal behavior of functions. For example, if an iexplore.exe calls to a cmd.exe, it is not a normal behavior, therefore the BPM will flag the iexplore.exe as a threat having a low risk. Based on this behavior pattern, a correction rule can be generated to specify that if the cmd.exe was executed through an iexplore.exe and not by the user, this is a high risk threat. On the other hand if such execution was initiated by the user this is not considered as a threat. That is, using this correlation rule any run of the cmd.exe from the iexplore.exe by the user will not be detected as a threat, thereby reducing the false alarm rate.

In accordance with exemplary embodiments of the invention, correlation rules may be either time based or order-based. The former type relates to a sequence of functions performed within a predefined time window, while the latter type correlates between a first and last function in a sequence of functions. A sequence of functions that are part of the same process/thread will be assigned with same threat level value.

The transport module 4250 generates and reports events to the management server 4130, such events describe kernel-space functions that were analyzed together with their threat levels and further returns the functions to the kernel-space.

Figure 10:
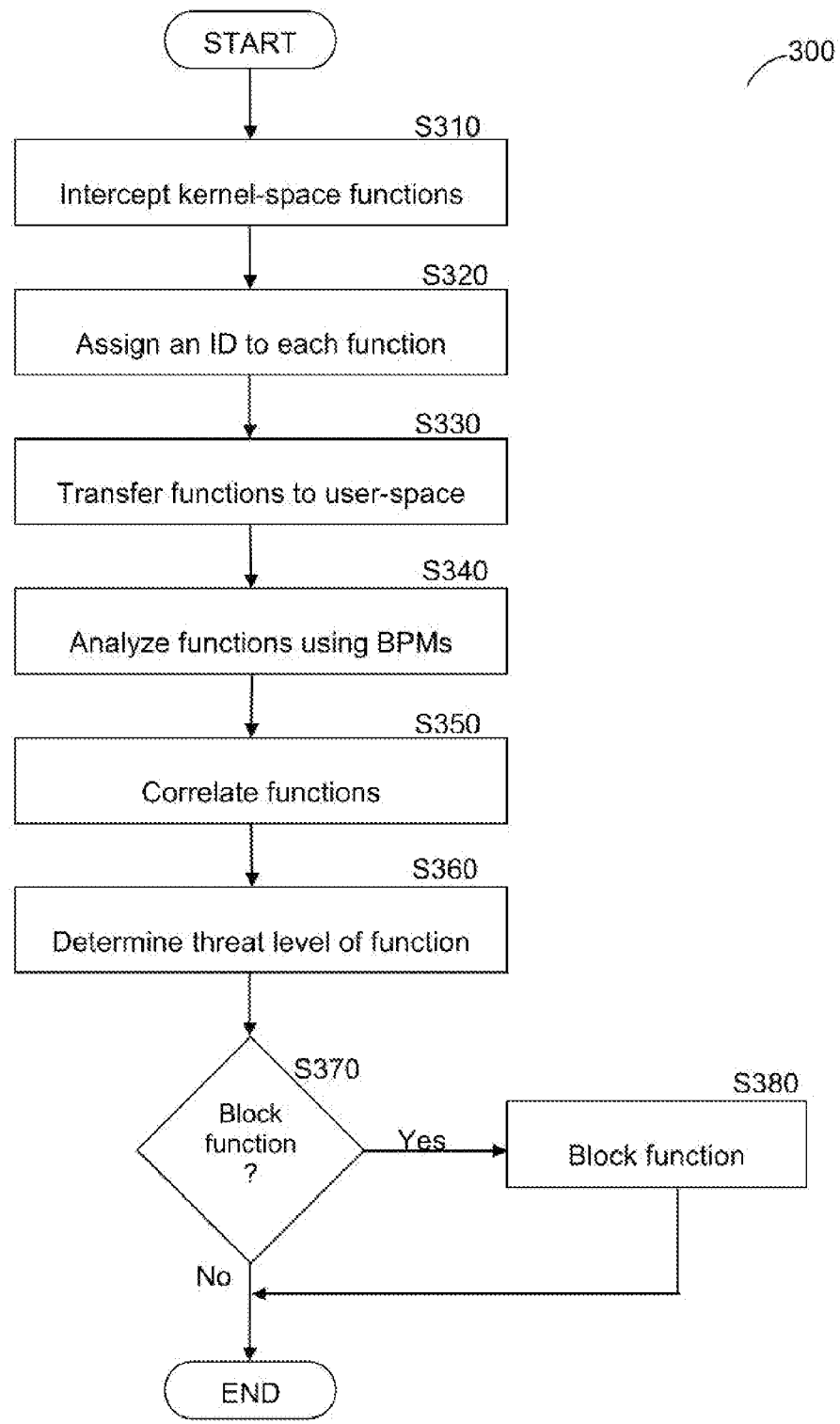
FIG. 10 is a flowchart describing a process for detecting and blocking malicious attacks implemented in accordance with an embodiment of the invention.

FIG. 10 shows a non-limiting and exemplary flowchart 300 describing the process for detecting and blocking malicious attacks implemented in accordance with an embodiment of the invention. At S310 kernel-space functions are intercepted, and then, at S320, each intercepted function is assigned with an ID. The ID of a function is based on the function's parameters and the computing layer it is applied to. At S330 each function having an ID is passed to the user-space. At S340 the function is analyzed in the user-space to determine the threat level of the function. Specifically, the function is matched against a BPM to determine if the pattern of the function is normal or malicious. At S350, the function is correlated with one or more other functions to determine if the behavior of the function is normal or malicious. At S360 based on the analysis results performed using the BPMs and correlation rules a threat level is assigned to the function. At S370 based on the function's threat level, it is determined whether the function should be blocked. Specifically, if the threat level is above a configurable threshold then, at S380, the function will be blocked; otherwise, execution ends.

It should be noted that the invention described herein provides a host-based intrusion prevention solution that utilizes a proactive approach. The BPMs and correlation rules derive from the behavior of kernel-space functions. As there is only a limited set of kernel-space functions all attacks, including zero-day attacks, can be detected using the BPMs and correlation rules. Furthermore, the BPMs and correlation rules are not based on the attacks' signatures, and as such are not updated when new malware or a variant of existing malware is released. Therefore, the invention provides a solution that is highly efficient to detect zero-day attacks.

Methods and systems for reacting to patterns in the system calls made to the kernels of computerized system are discussed in relation to the invention. In various embodiments disclosed, the patterns reacted to predefined patterns that are generated before the entire process of reacting to patterns initiates. In some embodiments the patterns may be dynamically modified, such as by dynamically setting parameters during run-time, wherein the reacting to patterns depend on the values to which such parameters were dynamically set. However, even in such embodiments of the invention, the setting of parameters and their utilization is usually governed by predefined rules that are set before the process of reacting to patterns begins.

Modeling of such patterns, or at least of the rules by which reaction to patterns may be handled, may be done in various ways—e.g. manually, automatically, etc.—and using different schemas—e.g. various languages, data-structure types, syntaxes, etc. While various examples are given to some syntaxes/languages of modeling such rules are offered below, it is noted that the invention is by no means limited to such implementations, and not only many variations may be made to the offered examples, entirely different solutions may also be implemented.

In various embodiments of the invention, at least part of those rules by which the reaction may be handled may be regarded as variation about "if-then" statements, and even variations of "if-then-else" statements. Usually, each rule may include information that enables matching of a system call to a rule (for example, a range of parameters that if parameters of a system call falls within, the rule may be selected), and an outcome indication, that may be used by an external reaction manager to determine what the reaction to such a system call should be.

It is noted that different rules may include, referring to the above example, partly over-lapping parameter ranges. If multiple rules may be matched to a single system call, various techniques of prioritizing between such rules may be implemented in various embodiments of the invention. Such prioritization may be based on information included within the rules themselves, on predetermined hierarchy within the rules data (e.g. order of the rules implies order of selection), and so forth.

It is noted that both the matching information and the outcome indication may be either implicit or explicit, and be interpreted differently in different systems. For example, the matching information may include hard-defined parameters, parameters that are determined differently for each system (e.g. operation system working directory), parameters that are determined during runtime and so forth, and the outcome indication may be explicit (like "stop" or "allow"), implicit (e.g. priority level that may be interpreted differently in different systems), conditional (e.g. depending on additional conditions), etc.

It is a noted that a distinction is made in the description between "rules data", which includes a whole representations of the rules (except, possibly, parameters that are determined during run time or which depend on system-parameters of the system in which the reacting is implemented, wherein the ways such parameters are used and determined may also be included in the rules data)—either in human comprehendible form or otherwise—to other one or more representations of the rules that are used during run-time (such as the data-structures discussed elsewhere in this document), and which are usually generated by processing of the rules data.

According to an embodiment of the invention, the rules that govern the reaction to patterns (hereinafter also simply referred to as "the rules") may be defined in an independent manner, wherein a definition of any of the rules does not affect any of the other rules. For example, each rule may be defined in a single code line (or other way of differentiating definitions of different rules, e.g. between delimiters such as brackets). It is noted that rules may be defined independently of each other even if rule information of a single rule is defined in a discontinuous manner or in various locations. It is noted that some rules may even be defined together (or at least pertain to common definitions) and still be independent of each other.

Other rules, in some embodiments of the invention, may depend on each other in various manners. For example, some rules may over-ride other rules (e.g. if pertaining to at least partly overlapping values of parameters), some other rules may call other rules, and so forth. However, such rules are not necessarily implemented.

In a proposed syntax, a simple rule may be defined using some or all of the following parameters:
i. Rule name or identifier (optional);
ii. Type of a single system call to which the rule pertain (in other embodiments, it may be more than one type). E.g. represented as a system call type identifier used in the OS);
iii. An outcome indicator (not necessarily included in every rule). The outcome indicator may be used, for example, by an auxiliary software to determine which action should be carried out in relation to the system call—e.g. allow, stop, log, etc.;
iv. Matching information, parameters that may be used by an auxiliary reaction manager to determine matching of system calls to that rule;

v. Interrelation information (optional), indicative of interrelations between this rule to at least one other rule. Such information may related, for example, to an order of rule selection (e.g. if multiple rules include partly overlapping matching information), and to activation of one rule by another (e.g. making available for matching or selection).

Additional information—such as remarks—which may be ignored when being interpreted by a machine—may also be included.

For example, a syntax of a simple rule according to an embodiment of the invention may be as following:

{[Name], [System-Call Type], [Outcome], [System-Call Initiator Information], [System-Call Request Information]. [Remarks]}

Clearly, an order of those information elements may be modified in other embodiments of the invention. Likewise, a person who is of skill in the art would appreciate that additional information element may also be included, while in some embodiments not all of the presented elements may be included. It is also noted that not necessarily all of the rules in a set of rule include the same information fields. For example, rules that pertain to system calls of some types may not include interrelation information, and rules with certain interrelations with other rules may not include outcome indication.

Box 1 exemplifies syntax of rules, according to an embodiment of the invention.

Box 1

```
{
CR_Ini, 37, 3, (*"\WINDOWS\system32", "cmd.exe"), (*, *".bmp"), "Initial event"
    {
        M1, 48, 2, (*"\WINDOWS\system32", "cmd.exe"), (*, "calc.exe");
        M2, 257, 2, (*"\WINDOWS\system32", "cmd.exe"), (*, *);
        !M3, 48, 2, (*"\WINDOWS\system32", "cmd.exe"), (*, "cmd.exe");
        M4, 48, 2, (*"\WINDOWS\system32", "cmd.exe"), (*, "taskmgr. exe");
        !~M5, 37, 2, (*"\WINDOWS\system32", "cmd.exe"), (*, *".exe");
        ~M6, 37, 2, (*"\WINDOWS\system32", "cmd.exe"), (*, *".doc");
        Exit
        {
            ExitRule, 48, 3, (*"cmd.exe"), (*, "notepad.exe"), "Exit Rule";
        }
    }
    SR_Exm, 37, 3, (*"\WINDOWS\system32", !"cmd.exe"), (*, *".xml"),"Description";
}
```

The names of the rules in the example of Box 1 are CR_Ini, M1 through M6, ExitRule, and SR_Exm. It is noted that in some embodiments of the invention, the names of the rules are only used for human comprehension, and have no other use. In other embodiments those names may be used, e.g., for interrelation information (in which one rules may refer to another rule).

It is noted that this numeral representation is just an example, and other implementations are also possible.

The outcome indicator in the example of Box 1 are indicated as numbers between 0 and 3 (in the exemplified rules, only outcomes 2 and 3 are used). In the offered example, the outcome indicators provide a priority indication, in which 0-priority is regarded as unharmful, while 3-priority means that the system call for which this rules is matched is considered highly hazardous. It is noted that the outcome indication may also have direct action implications (e.g. 0=allow, 1=allow but log, 2=allow only if in lower security settings, 3=block).

In the example of Box 1, the matching parameters are ordered in two sets of brackets—e.g.

(*"\WINDOWS\system32", "cmd.exe"), (*, "calc.exe"). In such an embodiment, the first part of the matching information pertains to the origin or source of the system call (the entity/process who made the call), wherein a differentiation is made between the path and the actual name of the file. The second part in that embodiment includes information pertaining to the content of the system call (what is being asked), which in this case is also included as a path and filename in a file system. The star symbol in the example is being used as a wild-card. It is noted that different types of system calls may include different matching information.

The text strings "Initial event", "Exit Rule", and "Description" in the example of Box 1 are merely remarks that have no special significance.

The Interrelation information in the example of Box 1 is included in three different ways: (a) hierarchy; (b) order; (c) explicit indication.

The hierarchical interrelation information is indicated by the curly brackets ("braces", { }) and their position in relation to the different rules. In the example of Box 1, the initiation rule CR_Ini is an initial rule that when matched starts a series of other rules that should be matched (or that should not be matched) in order for the series to reach its conclusion. Once those middle rules of the series that should be matched (M1, M2, M4 and M6) are matched and if those rules that should not be matched (M3 and M5, indicated in this example by an exclamation mark) are indeed not matched, the series may conclude with the exit rule named in this example "ExitRule".

The order interrelation is exemplified by the order of middle rules M1 through M6. In this example, the middles rules must be matched (or avoided being matched) according to their order within the series, unless otherwise indicated.

It is noted that in some embodiments this may mean that if rules are matched but not according to the order, the series should be terminated (e.g. if middle rule M2 is matched before rule M1 is matched, than the monitoring of the pattern reflected by that series is terminated, and would only be initiated again (if at all) when the initiation rule will be matched another time), while in other embodiments matching of rule M2 before a matching of rule M1 are just ignored. It is noted that in some embodiments of the invention, rule M2 may not be available at all for matching before rule M1 has been matched.

The tilde symbol (~) indicates that the rule in which it is included (M5 and M6 in the example) should be matched (or should not be matched) without any specific order. Middle Rule M6, for example, should be matched sometime after the initiation rule CR_Ini is matched in order for the exit rule made available, and middle rule M5 should not be matched at any point between the matching of the initiation rule and the exit rule (noted by the symbols ! for "NOT" and ~ for "Ignore Order"). According to an embodiment of the invention, Rule M3 should not be matched only after rule M2 was matched, but this restriction ceases once rule M4 is matched.

It is noted that middle rules for which order is important are sometimes referred to as "in-middle rules" while middle rules for which order is not important are sometimes referred to as "independent rules". Each of the independent rules needs to occur in order for the series reach its exit, but those are rules that are part of a series (or a "correlation"), in contrast to rules that do not belong to a series, which are sometimes referred to as "simple rules".

The explicit indication of interrelation information is exemplified in the text string "Exit", which indicates that the section describing the middle rules of the series is over, and the exit rule should now be matched—and, in the embodiment exemplified—an action should be carried out accordingly (e.g. according to the priority granted). It is noted that in some embodiments of the invention, the priority that should be assigned to the series call terminating the series (or the other Outcome indication) is indicated in the initial rule, while in other embodiments it may be indicated in the exit rule.

While not exemplified, in some embodiments of the invention some rules may be presented in the alternative, e.g. that one of two or more rules should be matched but not necessarily all of them. Such groups of alternative may be included in a specific place in the order of rules, or regardless of order—similar to the single rules discussed above.

It should be noted that while rules M1 through M6 are exemplified as including outcome indication, in some embodiments some middle rule may not include outcome indication, and in some embodiments of the invention, outcome indications of middle rules may be ignored—even if present. However, this is not necessarily so.

It should be noted that more than one series of rules may be included in such a representation of rules. Those one or more series may be used to describe or guide reaction to a series of system calls made to the kernel of a computerized entity. This enables reacting to a Pattern, in which each series in itself may not be suspicious or otherwise interesting, while as a pattern there is a significance to this group or series of such system calls. Such series of reacting to pattern may also be referred to in this document as "correlation".

Such patterns may be defined by series of rules that may be of different levels of specificity—from the very exact (e.g. a series of system calls having very specific parameters) to the quite loose (e.g. series of system calls having loose parameters, with little significance to order, and/or presented in the alternative).

It is also noted that while not exemplified in Box 1, some series may include sub-series, wherein a subseries should be finished before the rest of the series may continue.

According to an embodiment of the invention there is provided a dynamic variable. Non-limiting of dynamic variables were illustrated in FIGS. 4 and 5C. The following lines 15-19 in box 1 below provides an example of a dynamic variable:

---

BPM

---

{
CR_Ini, 37, 3, (*"\WINDOWS\system32", "cmd.exe"), (*, *".bmp"), "Initial event"
    {
    M1, 48, 2, (*"\WINDOWS\system32", "cmd.exe"), (*, "calc.exe");
    M2, 257, 2, (*"\WINDOWS\system32", "cmd.exe"), (*, *);
    !M3_NOT, 48, 2, (*"\WINDOWS\system32", "cmd.exe"), (*, "cmd.exe");
    M4, 48, 2, (*"\WINDOWS\system32", "cmd.exe"), (*, "taskmgr.exe");

-continued

BPM

```
    !~M5_INNot, 37, 2, (*"\WINDOWS\system32", "cmd.exe"), (*, *".exe");
    ~M6_IND, 37, 2, (*"\WINDOWS\system32", "cmd.exe"), (*, *".doc");
    Exit
    {
    ExitRule, 48, 3, (*,"cmd.exe"), (*, "notepad.exe"), "Exit Rule";
        }
    }
    SR_Exm, 37, 3, (*"\WINDOWS\system32", !"cmd.exe"), (*,
*".xml"),"Description";
    SR_Var-Exm, 47, 3, (*"\WINDOWS\system32", !"cmd.exe"), (*,
Var1=*".exe"),"Description";
    SR_Var-Exm2, 47, 3, (*"\WINDOWS", Var1), (*, *),"Description";
CR_Example, 48, 3, (*"\WINDOWS\system32", "cmd.exe"), (DynVar1=*, DynVar2=*), "Initial
event"
{
IM_Rule1, 37, 2, (DynVar1, DynVar2), (*, *".exe");
        IM_Rule2, 48, 2, (DynVar1, DynVar2), (*"\WINDOWS\system32",
"notepad.exe");
        Exit
        {
            ExitRule, 48, 3, (DynVar1, DynVar2), (*, *), "Exit Rule";
        }
    }
}
```

The rule denoted SR_Var-Exm includes a dynamic variable ('Var1=*".exe") which will receive its value, should there will be a match to the simple rule.

The rule denoted SR_Var-Exm2 demonstrates the use of this dynamic variable ('var1') which now contains a value—in this case a process name.

Dynamic variables can be part of correlation as well as part of simple rule.

Figure 11:
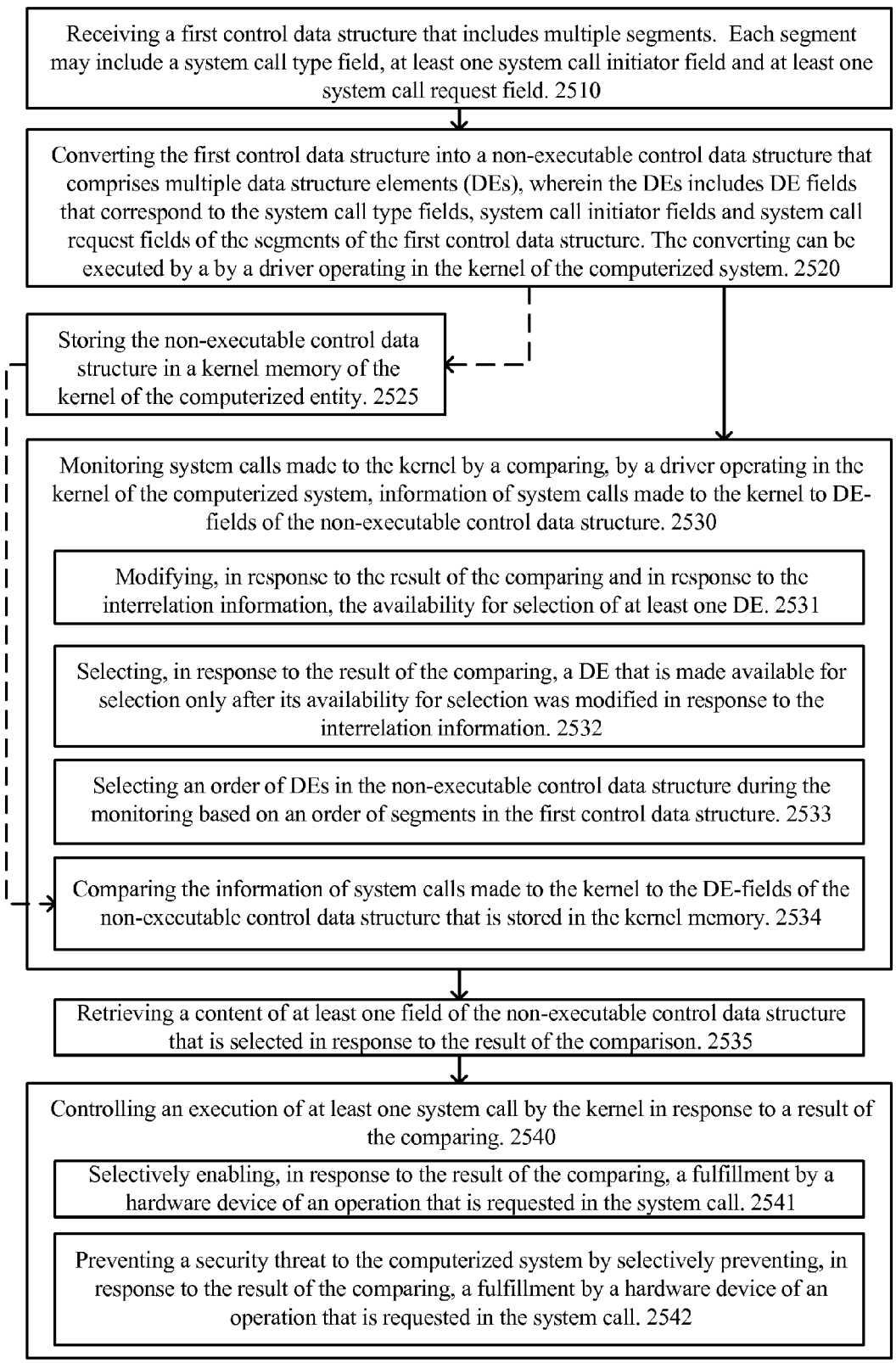
FIG. 11 is a flowchart.

FIG. 11 illustrates method 2500 for reacting to system calls made to a kernel of a computerized system according to an embodiment of the invention.

Referring to the examples set forth in the other drawings, method 2500 may be implemented by dedicated driver (such as but not limited to one or more dedicated drivers of the computer program product 220 a dedicated mini-filter driver or a dedicated network driver) operating in the kernel of a computerized system.

It is noted that in other embodiments, method 2500 may be implemented by an entity operating not in kernel mode (e.g. operating in user-mode). In some embodiments of the invention, method 2500 may also be implemented by a hardware system, and/or by more than one entity.

It is noted that embodiments of the invention that are disclosed in relation to FIGS. 2A, 2B, 4, 7 and 10 may be implemented, mutatis mutandis, in method 2500 even if not explicitly so, and vice versa.

It should be noted that the term "computerized system" is not limited to software solutions or to hardware ones, and may be used to refer to any out of a variety that extends both to hardware and to the operating system and other software used. For example, various computerized systems in which kernel may be implemented are personal computers, servers, cellular telephones and other portable computerized systems, production machinery computers/networks, Microsoft Windows based systems, Linux based system, Android based systems, and so forth.

Method 2500 may start with stage 2510 of receiving a first control data structure that includes multiple segments. Each segment may include a system call type field, at least one system call initiator field and at least one system call request field.

Stage 2510 may be followed by stage 2520 of converting the first control data structure into a non-executable control data structure that comprises multiple data structure elements (DEs), wherein the DEs includes DE fields that correspond to the system call type fields, system call initiator fields and system call request fields of the segments of the first control data structure. The converting can be executed by a driver operating in the kernel of the computerized system.

Stage 2520 may be followed by stage 2530 of monitoring system calls made to the kernel by a comparing, by a driver operating in the kernel of the computerized system, information of system calls made to the kernel to DE-fields of the non-executable control data structure. The monitoring can be executed by a by a driver operating in the kernel of the computerized system.

Stage 2530 can be followed by stage 2535 of retrieving a content of at least one field of the non-executable control data structure that is selected in response to the result of the comparison.

Stage 2535 may be followed by stage 2540 of controlling an execution of at least one system call by the kernel in response to a result of the comparing.

Stage 2540 can includes controlling the execution in response to the content of the at least one field.

According to an embodiment of the invention the first control data structure may include interrelations information indicative of interrelations between segments of at least one group of segments.

Stage 2520 may include inserting into DEs of the non-executable control data structure pointers to other DEs selected in response to the interrelations-information.

Stage 2530 may include stages 2531 and 2532. Stage 2531 may include modifying, in response to the result of the comparing and in response to the interrelation information, the availability for selection of at least one DE.

Stage 2532 may include selecting, in response to the result of the comparing, a DE that is made available for selection only after its availability for selection was modified in response to the interrelation information.

Stage 2530 may include stage 2533 of selecting an order of DEs in the non-executable control data structure during the monitoring based on an order of segments in the first control data structure.

Stage 2540 may include stage 2541 of selectively enabling, in response to the result of the comparing, a fulfillment by a hardware device of an operation that is requested in the system call.

Stage 2540 may include stage 2542 of preventing a security threat to the computerized system by selectively preventing, in response to the result of the comparing, a fulfillment by a hardware device of an operation that is requested in the system call.

According to an embodiment of the invention stage 2520 is also followed by stage 2525 of storing the non-executable control data structure in a kernel memory of the kernel of the computerized entity. Stage 2525 may be followed by stage 2534 of comparing the information of system calls made to the kernel to the DE-fields of the non-executable control data structure that is stored in the kernel memory. Stage 2534 may be included in stage 2530.

Method 2500 can be executed by a processor of a computer that executed instructions stored in a computer readable medium, tangibly embodied in a non-transitory storage media.

Method 2500 can be executed by any of the mentioned above computers or systems. It can be executed, for example, by a computer that implements a kernel, and includes a processor that is configured to run processes in kernel mode and to run other processes not in kernel mode.

Although certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for reacting to system calls made to a kernel of a computerized system, the method comprising:
   receiving a first control data structure that comprises multiple segments; wherein each segment comprises a system call type field, at least one system call initiator field and at least one system call request field;
   converting the first control data structure into a non-executable control data structure that comprises multiple data-structure elements (DEs), wherein the DEs comprise DE fields that correspond to the system call type fields, to the system call initiator fields and to the system call request fields of the segments of the first control data structure;
   monitoring system calls made to the kernel by comparing information of system calls made to the kernel to DE-fields of the non-executable control data structure; and
   controlling an execution of at least one system call by the kernel in response to a result of the comparing;
   wherein a control of an execution of a system call out of the at least one system call comprises:
      selecting a rule out of a group of rules that is stored in a kernel memory of the computerized system, in response to the result of the comparing;
      assigning a priority to the system call in response to the rule selected; and
      selectively enabling transmission of the system call to a destination kernel entity, in response to the priority assigned to the system call; and
   wherein the selecting of the rule is preceded by retrieving rules data by a dedicated driver from a nonvolatile memory of the computerized system which is not a kernel memory;
   processing the rules data to provide a different representation of the group of rules, and writing the different representation of the group of rules to the kernel memory; and
   wherein the selecting of the rule is responsive to dynamic variables that are determined after the processing of the rules data is complete.

2. The Method of claim 1, wherein the controlling is preceded by retrieving a content of at least one field of the non-executable control data structure that is selected in response to the result of the comparison, wherein the controlling comprises controlling the execution in response to the content of the at least one field.

3. The Method of claim 1, wherein the first control data structure comprises interrelations information indicative of interrelations between segments of at least one group of segments, wherein the converting comprises inserting into DEs of the non-executable control data structure pointers to other DEs selected in response to the interrelations-information.

4. The Method of claim 3, further comprising modifying, in response to the result of the comparing and in response to the interrelation information, the availability for selection of at least one DE; wherein the monitoring comprises selecting, in response to the result of the comparing, a DE that is made available for selection only after its availability for selection was modified in response to the interrelation information.

5. The Method according to claim 1, wherein an order of segments in the first control data structure determines a selection order of DEs in the non-executable control data structure during the monitoring.

6. The Method according to claim 5, wherein the controlling comprises selectively enabling, in response to the result of the comparing, a fulfillment by a hardware device of an operation that is requested in the system call.

7. The Method according to claim 5, wherein the controlling comprises preventing a security threat to the computerized system by selectively preventing, in response to the result of the comparing, a fulfillment by a hardware device of an operation that is requested in the system call.

8. The Method according to claim 5, wherein the converting is followed by storing the non-executable control data structure in a kernel memory of the kernel of the computerized entity, wherein the comparing comprises comparing the information of system calls made to the kernel to the DE-fields of the non-executable control data structure that is stored in the kernel memory.

9. The Method of claim 5, wherein the converting and monitoring are carried out by a dedicated driver operating in kernel mode of a computerized system.

10. The Method according to claim 5, wherein the controlling is preceded by retrieving a content of at least one field of the non-executable control data structure that is selected in response to the result of the comparison, wherein the controlling comprises controlling the execution in response to the content of the at least one field.

11. A computer implementing a kernel, the computer comprising:
   a hardware device;
   a processor that is configured to run processes in kernel mode and to run other processes not in kernel mode, wherein the processor is configured to execute, when in the kernel mode, the following processes:

receiving a first control data structure that comprises multiple segments; wherein each segment comprises a system call type field, at least one system call initiator field and at least one system call request field;

converting the first control data structure into a non-executable control data structure that comprises multiple data-structure elements (DEs), wherein the DEs comprise DE fields that correspond to the system call type fields, to the system call initiator fields and to the system call request fields of the segments of the first control data structure;

monitoring system calls made to the kernel by a comparing information of system calls made to the kernel to DE-fields of the non-executable control data structure; and controlling an execution of at least one system call by the kernel in response to a result of the comparing;

wherein a control of an execution of a system call out of the at least one system call comprises:

determining selection parameters that relate to the system call by processing information of the system call;

deterministically selecting a single data-structure element (DSE) of a data-structure in response to a type of the system call, to at least one other determined selection parameter, and to a status of an activity flag comprised in the DSE that indicates an availability of the DSE for selection;

wherein the selecting comprises selecting a DSE that comprises an activity flag that indicates that the DSE is available for selection;

wherein at least one DSE of the data-structure is an inactive DSE that comprises an activity flag indicating that the inactive DSE is not available for selection;

modifying an activity flag of at least one DSE of the data-structure, in response to activeness instructions stored in the DSE selected;

assigning a priority to the system call in response to a content of the DSE selected; and selectively enabling fulfillment of the operation by the hardware device, in response to the priority assigned to the system call; and wherein the processor is a hardware processor.

12. The computer of claim 11, wherein the processor is further configured to retrieve, before the controlling of the execution, a content of at least one field of the non-executable control data structure that is selected in response to the result of the comparison, wherein the controlling comprises controlling the execution in response to the content of the at least one field.

13. The computer of claim 11, wherein the first control data structure comprises interrelations information indicative of interrelations between segments of at least one group of segments, wherein the processor is further configured to insert into DEs of the non-executable control data structure pointers to other DEs selected in response to the interrelations-information.

14. The computer of claim 13, wherein the processor is further configured to modify, in response to the result of the comparing and in response to the interrelation information, the availability for selection of at least one DE; wherein the monitoring comprises selecting, in response to the result of the comparing, a DE that is made available for selection only after its availability for selection was modified in response to the interrelation information.

15. The computer of claim 11, wherein an order of segments in the first control data structure determines a selection order of DEs in the non-executable control data structure during the monitoring.

16. The computer of claim 15, wherein the processor is further configured to selectively enable, in response to the result of the comparing, a fulfillment by a hardware device of an operation that is requested in the system call.

17. The computer of claim 15, wherein the processor is further configured to prevent a security threat to the computerized system by selectively preventing, in response to the result of the comparing, a fulfillment by a hardware device of an operation that is requested in the system call.

18. The method according to claim 5, wherein the converting is followed by storing the non-executable control data structure in a kernel memory of the kernel of the computerized entity, wherein the comparing comprises comparing the information of system calls made to the kernel to the DE-fields of the non-executable control data structure that is stored in the kernel memory.

19. The computer of claim 15, wherein the processor hosts a dedicated driver operating in kernel mode of a computerized system that is configured to execute the converting and the monitoring.

20. The computer of claim 15 wherein the controlling is preceded by retrieving a content of at least one field of the non-executable control data structure that is selected in response to the result of the comparison, wherein the controlling comprises controlling the execution in response to the content of the at least one field.

21. A computer readable medium, tangibly embodied in a non-transitory storage media, with instruction which, when executed, cause a processor of a computer that implements a kernel, to:

receive a first control data structure that comprises multiple segments; wherein each segment comprises a system call type field, at least one system call initiator field and at least one system call request field; wherein the computer further comprises a hardware device;

convert the first control data structure into a non-executable control data structure that comprises multiple data-structure elements (DEs), wherein the DEs comprise DE fields that correspond to the system call type fields, to the system call initiator fields and to the system call request fields of the segments of the first control data structure;

monitor system calls made to the kernel by a comparing information of system calls made to the kernel to DE-fields of the non-executable control data structure; and control an execution of at least one system call by the kernel in response to a result of the comparing;

wherein a control of an execution of a system call out of the at least one system call comprises:

determining selection parameters that relate to the system call, by processing information of the system call;

deterministically selecting a single data-structure element (DSE) of a data-structure in response to a type of the system call, to at least one other determined selection parameter, and to a status of an activity flag comprised in the DSE that indicates an availability of the DSE for selection;

wherein the selecting comprises selecting a DSE that comprises an activity flag that indicates that the DSE is available for selection;

wherein at least one DSE of the data-structure is an inactive DSE that comprises an activity flag indicating that the inactive DSE is not available for selection;

modifying an activity flag of at least one DSE of the data-structure, in response to activeness instructions stored in the DSE selected;

assigning a priority to the system call in response to a content of the DSE selected; and selectively enabling fulfillment of the operation by the hardware device, in response to the priority assigned to the system call.

22. The computer readable medium according to claim 21, further storing instructions for retrieving a content of at least one field of the non-executable control data structure that is selected in response to the result of the comparison, wherein the controlling comprises controlling the execution in response to the content of the at least one field.

23. The computer readable medium according to claim 21, wherein the first control data structure comprises interrelations information indicative of interrelations between segments of at least one group of segments, wherein the computer readable medium further stores instructions for inserting into DEs of the non-executable control data structure pointers to other DEs selected in response to the interrelations-information.

24. The computer readable medium according to claim 23, further stores instructions for modifying, in response to the result of the comparing and in response to the interrelation information, the availability for selection of at least one DE; wherein the monitoring comprises selecting, in response to the result of the comparing, a DE that is made available for selection only after its availability for selection was modified in response to the interrelation information.

25. The computer readable medium according to claim 21, wherein an order of segments in the first control data structure determines a selection order of DEs in the non-executable control data structure during the monitoring.

26. The computer readable medium according to claim 25, further storing instructions for selectively enabling, in response to the result of the comparing, a fulfillment by a hardware device of an operation that is requested in the system call.

27. The computer readable medium according to claim 25, further storing instructions for preventing a security threat to the computerized system by selectively preventing, in response to the result of the comparing, a fulfillment by a hardware device of an operation that is requested in the system call.

28. The computer readable medium according to claim 25, further storing instructions for storing the non-executable control data structure in a kernel memory of the kernel of the computerized entity, wherein the comparing comprises comparing the information of system calls made to the kernel to the DE-fields of the non-executable control data structure that is stored in the kernel memory.

29. The computer readable medium according to claim 25, further storing instructions for retrieving a content of at least one field of the non-executable control data structure that is selected in response to the result of the comparison, wherein the controlling comprises controlling the execution in response to the content of the at least one field.

30. The computer readable medium according to claim 25, wherein the instructions are executed by a dedicated driver operating in kernel mode that is run by the processor.

31. The method according to claim 5 wherein the non-executable control data structure comprises a dynamic variable, wherein a value of the dynamic variable is known only after an initiation of the monitoring.

32. The method according to claim 31 wherein the value of the dynamic variable is responsive to an outcome of a comparison of information of a system call made to the kernel to a DE-field of the non-executable control data structure.

33. The computer according to claim 11 wherein at least one of the following is true: (i) the processor is a central processing unit, (ii) the processor is a multi-core processor, (iii) the processor has a hardware implementation of the kernel mode.

* * * * *